United States Patent [19]

Yamamoto et al.

[11] Patent Number: 5,708,519
[45] Date of Patent: Jan. 13, 1998

[54] HOLOGRAPHIC AUTOMOTIVE HIGH MOUNT STOP LAMP

[75] Inventors: Norimasa Yamamoto; Hideaki Satsukawa; Koichi Sakakibara, all of Shizuoka, Japan

[73] Assignee: Koito Manufacturing Co., Ltd., Tokyo, Japan

[21] Appl. No.: 678,167

[22] Filed: Jul. 11, 1996

Related U.S. Application Data

[63] Continuation of Ser. No. 220,689, Mar. 31, 1994, abandoned.

[30] Foreign Application Priority Data

| Mar. 31, 1993 | [JP] | Japan | 5-094871 |
| Apr. 19, 1993 | [JP] | Japan | 5-114280 |
| Apr. 26, 1993 | [JP] | Japan | 5-121993 |
| Apr. 26, 1993 | [JP] | Japan | 5-121994 |
| Jun. 25, 1993 | [JP] | Japan | 5-177600 |

[51] Int. Cl.$^6$ ........................ G02B 5/32
[52] U.S. Cl. .............. 359/15; 359/13; 340/479; 362/80.1
[58] Field of Search ............ 359/1, 13, 14, 359/15, 22, 25; 362/61, 80, 80.1; 340/479

[56] References Cited

U.S. PATENT DOCUMENTS

| 4,652,979 | 3/1987 | Arima | 362/80.1 |
| 4,722,023 | 1/1988 | Arima et al. | 362/80 |
| 4,831,501 | 5/1989 | Okamoto et al. | 362/61 |
| 4,892,369 | 1/1990 | Moss | 359/15 |
| 4,893,220 | 1/1990 | Kakidaira | 362/80.1 |
| 4,916,593 | 4/1990 | Moss et al. | 362/80.1 |
| 4,945,456 | 7/1990 | Kakidaira | 362/80.1 |
| 4,972,303 | 11/1990 | Machida et al. | 362/80 |
| 5,050,051 | 9/1991 | Machida et al. | 362/80.1 |
| 5,101,193 | 3/1992 | Smith et al. | 340/479 |
| 5,186,533 | 2/1993 | Hori | 362/80.1 |
| 5,201,579 | 4/1993 | Roof et al. | 362/368 |
| 5,243,502 | 9/1993 | Cappuccitti et al. | 362/80.1 |
| 5,303,129 | 4/1994 | Hori | 362/80.1 |

FOREIGN PATENT DOCUMENTS

| 420229A1 | 4/1991 | European Pat. Off. |
| 8100244U1 | 7/1981 | Germany . |
| 4102571A1 | 1/1991 | Germany . |
| 60-199746A | 10/1985 | Japan . |
| 365448A | 3/1991 | Japan . |
| 4293632A | 10/1992 | Japan . |
| 4342626 | 11/1992 | Japan . |

*Primary Examiner*—Ricky D. Shafer
*Assistant Examiner*—Darren E. Schuberg
*Attorney, Agent, or Firm*—Sughrue, Mion, Zinn, Macpeak & Seas, PLLC

[57] ABSTRACT

A hologram fitted to a rear window glass is irradiated with light from a regenerative light source to produce a holographic image to ensure the effective operation of a high mount stop lamp and to simultaneously prevent light from dazzling the driver of a following vehicle. The high mount stop lamp is provided with a hologram disposed on the inside surface of a rear automotive window glass, and a regenerative light source for regenerating the holographic image by irradiating the hologram. Part of the regenerative light source is buried in a recess in a rear parcel shelf of the automobile. A shielding wall is fitted to a part of the periphery of the regenerative light source so as, together with the rear window glass, to surround the regenerative light source to shield the light directed to the front of the automobile. The shielding wall is formed, for example, by folding up part of the decorative panel of the rear parcel shelf in the form of a wall.

6 Claims, 18 Drawing Sheets

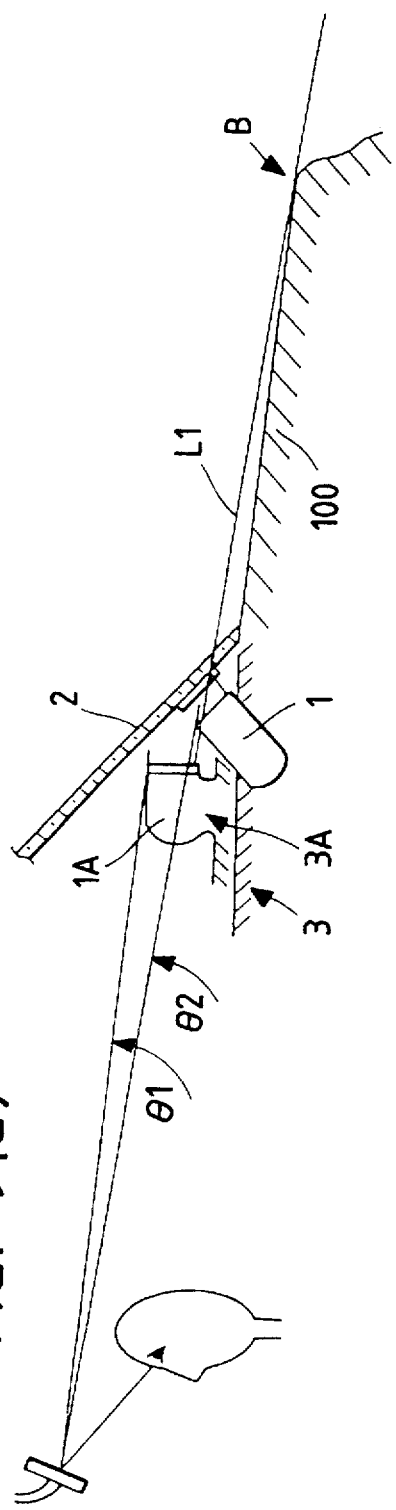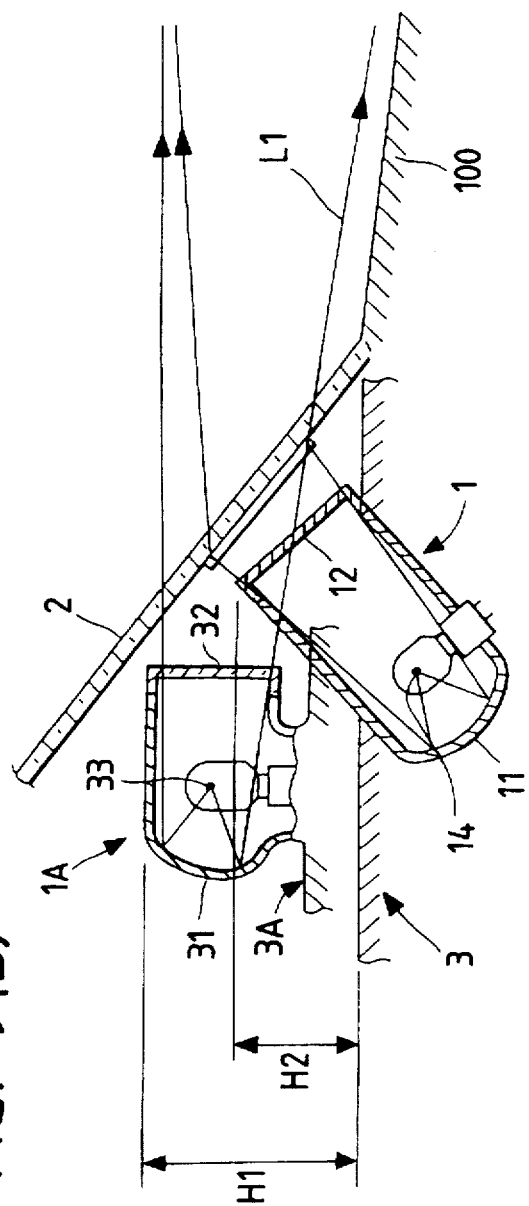

HOLOGRAPHIC AUTOMOTIVE HIGH MOUNT STOP LAMP

This is a Continuation of application Ser. No. 08/220,689, filed Mar. 31, 1994, now abandoned.

BACKGROUND OF THE INVENTION

The present invention relates to a high mount stop lamp (hereinafter "HMSL") for use on vehicles such as automobiles, and more particularly to an HMSL using a hologram.

An automotive HMSL is effective in alerting the driver of a following driver to the application of the brakes in the preceding car. An HMSL proposed recently is arranged so that it emits light through the rear window glass of an automobile. However, the provision of such an HMSL at the rear window position may restrict the visibility through the rear window. To alleviate this problem, the use of a hologram in combination with an HMSL has been proposed. Unexamined Japanese Patent Publication Hei-3-65448 (1991), for example, proposes to provide a hologram recorded with a holographic image at the rear automotive window glass so as to produce a holographic image directed to the following car when the hologram is illuminated. In an HMSL of this type, the following car driver can be made to visually perceive a red lens step image by recording a lens step image on the hologram. If red light is used as the regenerative illuminating light source for the hologram, the HMSL will function effectively.

FIG. 1 is a schematic perspective view of an exemplary stop lamp, wherein a hologram 3 in the form of a film is attached to the inside surface of the rear automotive window glass 2, and a regenerative light source 10 is located on a rear parcel shelf 4 opposite to the hologram 3. The hologram 3 is irradiated with light from the regenerative light source 10, so that a holographic image is regenerated outside the rear window glass 2.

There has also been proposed the use of a diffraction grating in place of the hologram in a similar type of HMSL. In this case, a diffraction image is formed to the rear of a car so as to cause a following car driver visually perceive the image.

In such an HMSL, the hologram, which is nearly transparent, is provided on the rear window glass. As the regenerative light source for illuminating the hologram can be installed apart from the rear window glass, the HMSL is advantageous in that, even if the hologram is installed over a wide area of the rear window glass, the restriction of the rear visual field of the driver is limited.

The present inventors have made a detailed study of conventional HMSLs and found that if the regenerative light source is mounted apart from the hologram, when some object is placed between the regenerative light source and the hologram, the object can block off the regenerative light radiated to the hologram, thus making effective illumination of the hologram impossible. If the regenerative light source is placed, for example, in the rear parcel shelf or the roof inner panel of an automobile, baggage, toys, etc., placed on the rear parcel shelf can often block off the regenerative light.

Further, red light from the regenerative light source can be reflected from the surface of the hologram and the inner surface of the rear window glass into the driver's field of vision, dazzling the driver. To alleviate such a problem, the regenerative light source can be placed in such a way that the regenerative and reflected light is prevented from coming into the driver's field of vision. However, because the rear window glass and the hologram have a curved surface, it is difficult to position the regenerative light source properly and therefore difficult to completely prevent the light from dazzling the driver.

Since the hologram 3 is adhered to the inside surface of the curved rear window glass 2, as shown in FIG. 1, the hologram 3 thus installed follows the curvature of the rear window glass. On the other hand, the opening of the regenerative light source 10 is shaped so as to be straight and longitudinally narrow in conformance with the shape of the hologram 3. Consequently, regenerative light L2 is incident on a rectangular portion of the rear window glass 2 as shown by a dotted line when the light is radiated from the regenerative light source 10 onto the hologram 3. In other words, there is an area in which the radiation pattern of the regenerative light does not conform with the hologram 3, and the hologram 3 in this area is left unlit. Due to this misalignment, the image regeneration efficiency of the hologram is reduced, and the light that does not fall within the hologram but is leaked outside the rear window glass 2 not only impairs the visual recognizability of the hologram, but also degrades the appearance of the HMSL.

SUMMARY OF THE INVENTION

An object of the present invention is to provide a high mount stop lamp (HMSL) which obtains the advantages of HMSLs using a hologram to ensure effective operation while simultaneously preventing light from dazzling a driver.

Another object of the present invention is to provide an HMSL designed to irradiate, for example, a curved hologram attached to the inner surface of a rear window glass effectively with regenerative light thereby to improve the external appearance of the HMSL as well as the visual recognizability of the holographic image.

Achieving the above and other objects, an HMSL according to the present invention comprises a hologram provided on a rear window glass of an automobile or the like, and a regenerative light source for regenerating a holographic image to the rear of an automobile by radiating the hologram, wherein part of the regenerative light source is buried in a recess formed in a rear parcel shelf of the automobile, and a shielding wall, together with the rear window glass, is fitted to part of the periphery of the regenerative light source to surround the regenerative light source so as to shield the light directed to the front of the automobile.

For example, the shielding wall may be formed by folding part of the panel forming the rear parcel shelf around the regenerative light source, and extending the leading end of the panel to a position where the leading end is adjacent the inside surface of the rear window glass.

Otherwise, the shielding wall can be formed by extending part of the peripheral edge of the body of the regenerative light source integrally or substantially integrally along the outside of that body in the form of an apron.

According to another embodiment of the invention, the regenerative light source emits light from the opening of a body incorporating the light source, the opening being curved along the hologram. In this case, the regenerative light source is capable of emitting parallel beams from the opening of the body incorporating the light source, the center line of the opening being curved so that it conforms to the curvature of the hologram.

Otherwise, the regenerative light source can be arranged to emit light to be gathered from the opening of the body incorporating the light source, the opening being curved to conform with the curvature of the hologram.

BRIEF DESCRIPTION OF THE DRAWINGS

FIGS. 9(a) and 9(b) are exemplary diagrams illustrating a difference in height in a conventional HMSL;

FIGS. 28(a), 28(b) and 28(c) are perspective view of other examples of holograms used with the present invention, in which FIG. 28(a) shows laterally subdividing the hologram, FIG. 28(b) shows vertically and laterally subdividing a hologram and FIG. 28(c) shows visual recognizability of a desired pattern;

DESCRIPTION OF THE PREFERRED EMBODIMENTS

Referring to the accompanying drawings, preferred embodiments of the present invention will be described.

Figure 1:
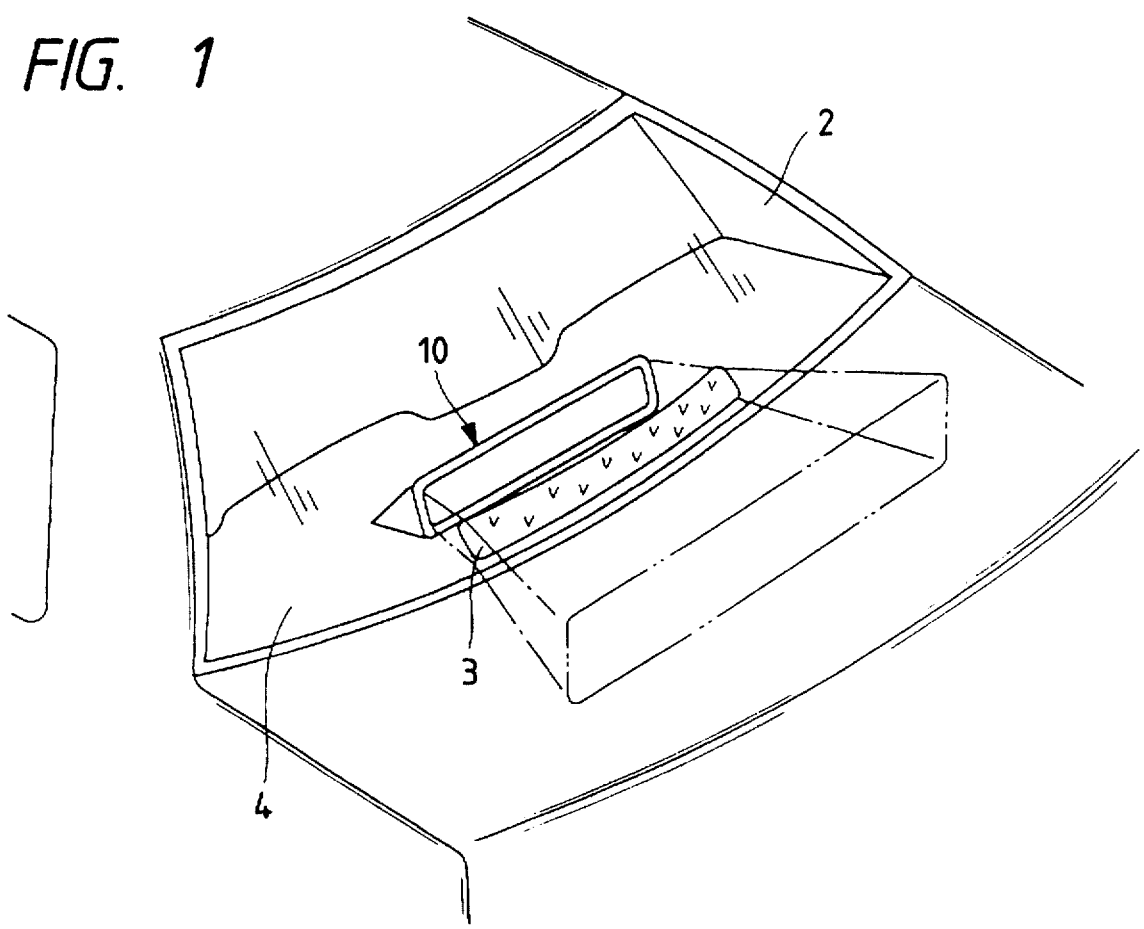
FIG. 1 is an external perspective view of an HMSL to which the present invention is applied.
Figure 2:
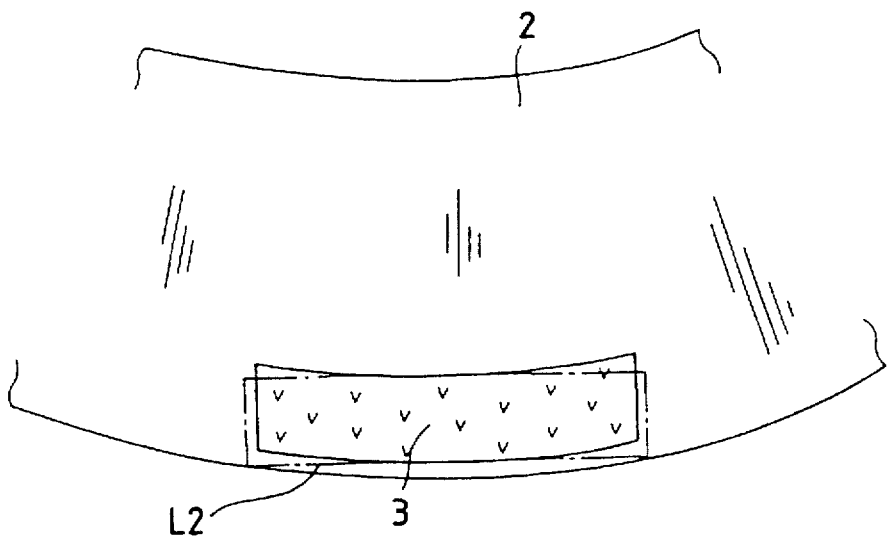
FIG. 2 is a diagram showing the relation between a hologram and a radiation pattern in a conventional HMSL.
Figure 3:
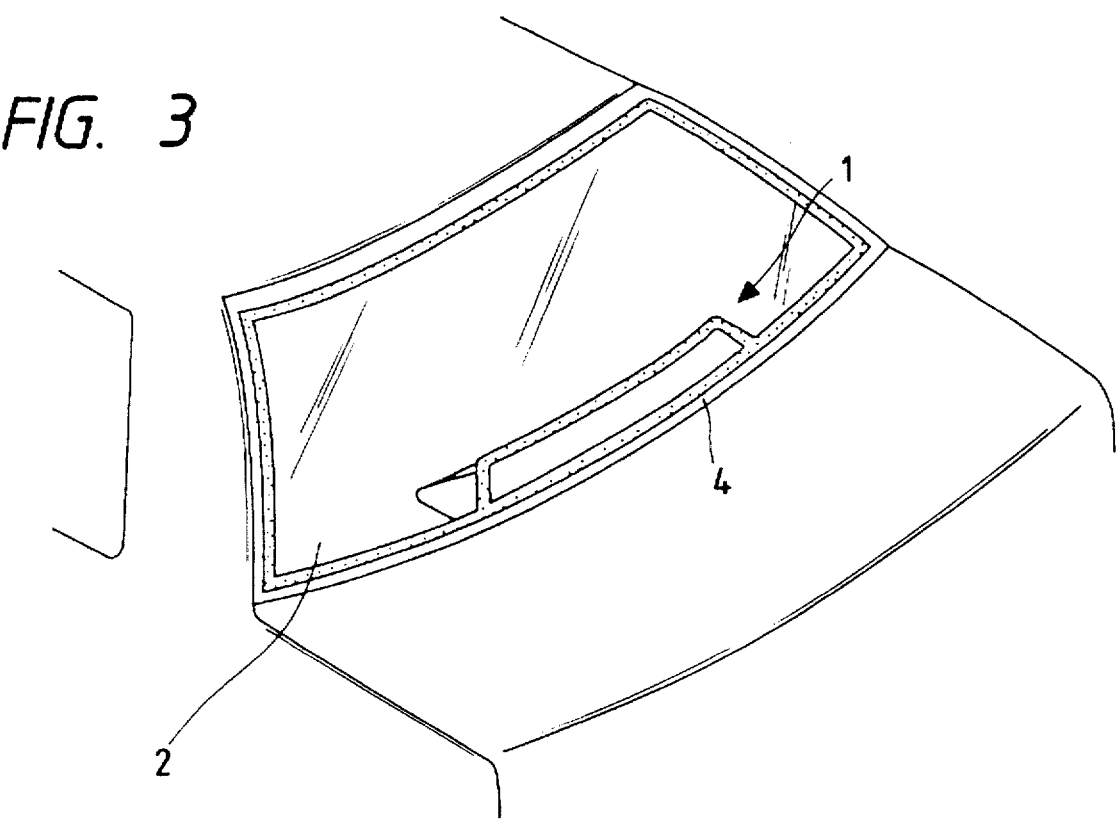
FIG. 3 is a schematic perspective view of the rear side of an automobile equipped with an HMSL according to a first embodiment of the invention.
Figure 4:
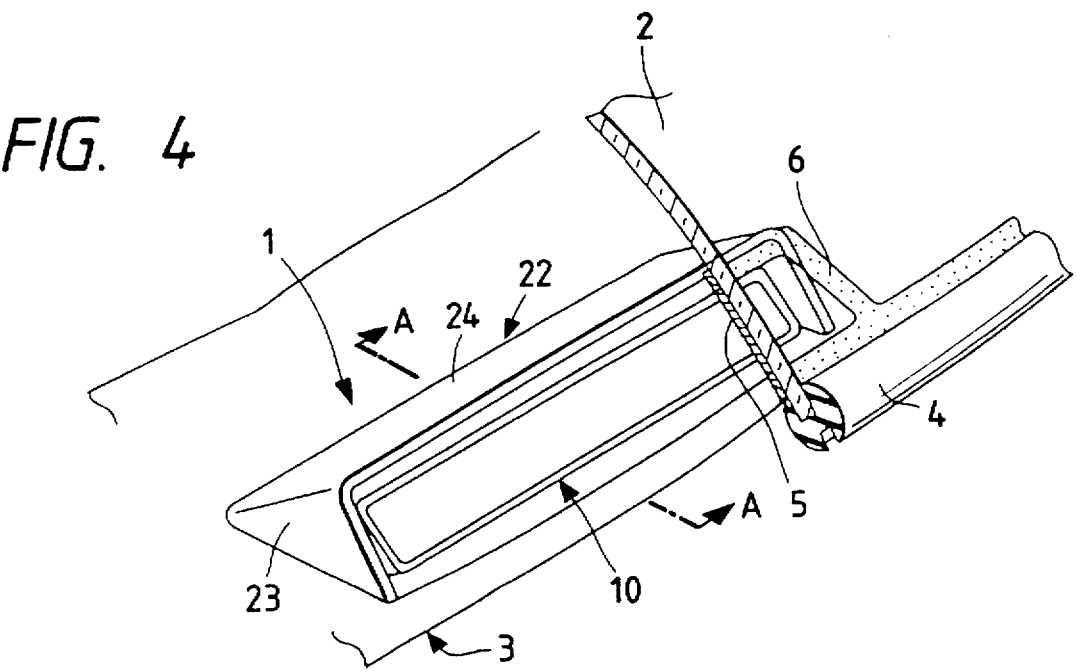
FIG. 4 is a partially cutaway perspective view of the HMSL according to the first embodiment of the invention.
Figure 5:
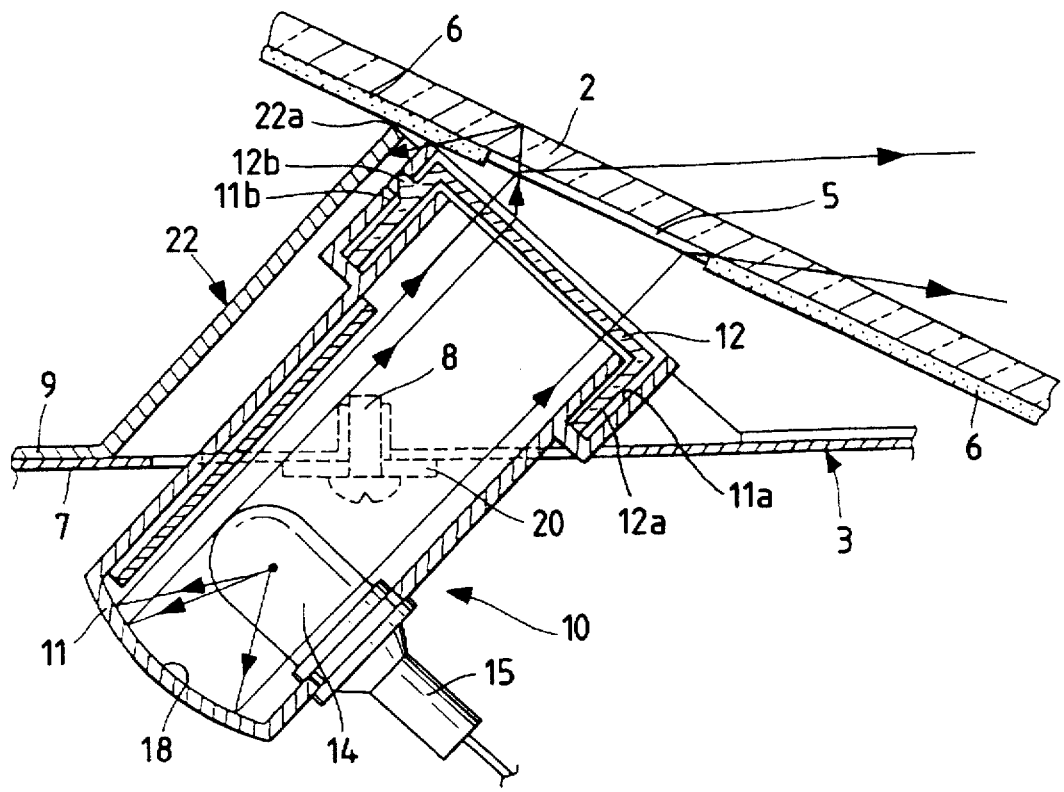
FIG. 5 is an enlarged sectional view taken on a line A—A in FIG. 4.

FIG. 3 is a schematic perspective view of a rear window glass as viewed from the back in an automobile equipped with an HMSL according to the first embodiment of the invention. FIG. 4 is a partially cutaway perspective view of HMSL according to the first embodiment of the invention. FIG. 5 is an enlarged sectional view taken on line A—A of FIG. 4. In these drawings, reference numeral 2 denotes a rear window glass fitted to an opening of a car body with a weather strip 4, and reference numeral 3 designates a rear parcel shelf. A hologram 5 is integrally joined to the inside surface along the lower edge of the central part of the rear window glass 2. Although a detailed description will be omitted, in general the hologram 5 is manufactured by forming a photosensitive layer on a transparent plastic base, and then holographically exposing the photosensitive layer with an image of ordinary lens steps of a conventional HMSL. The hologram 5 is formed with a laterally long, narrow belt-like shape, and is bonded to the inside of the rear window glass 2 with a transparent adhesive (not shown).

A black ceramic coating film 6 is formed on the inside of the rear window glass 2 in such a way as to surround the hologram 5 to make the contours of the hologram 5 discernible and to suppress unwanted reflected light, as will be described in more detail later. The black ceramic coating film 6 is formed over the entire peripheral edge of the rear window glass 2 in view of design considerations.

Figure 6:
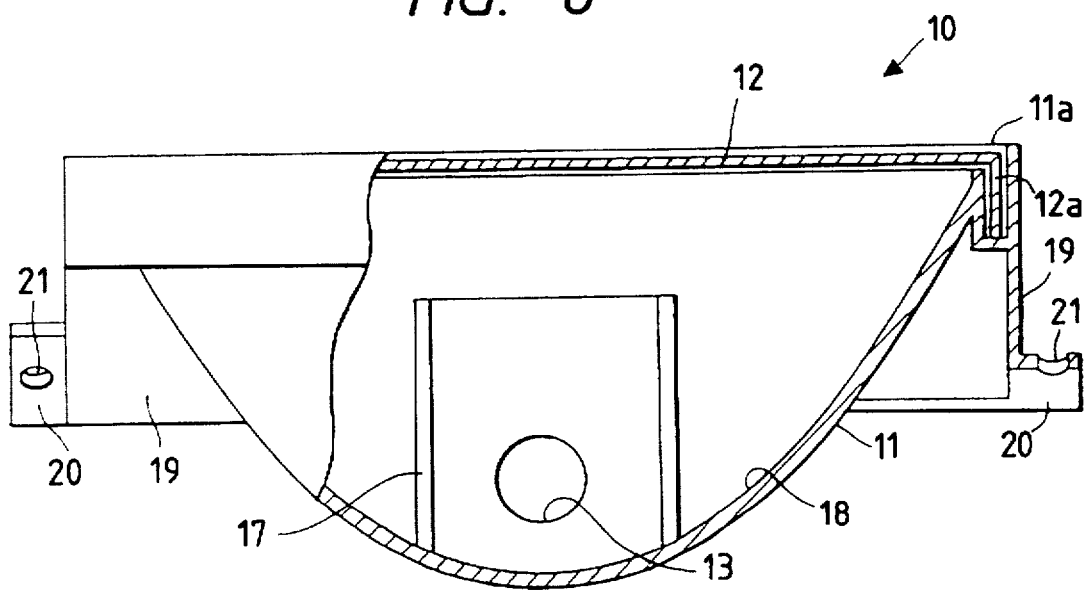
FIG. 6 is a partially cutaway plan view of a regenerative light source.
Figure 7:
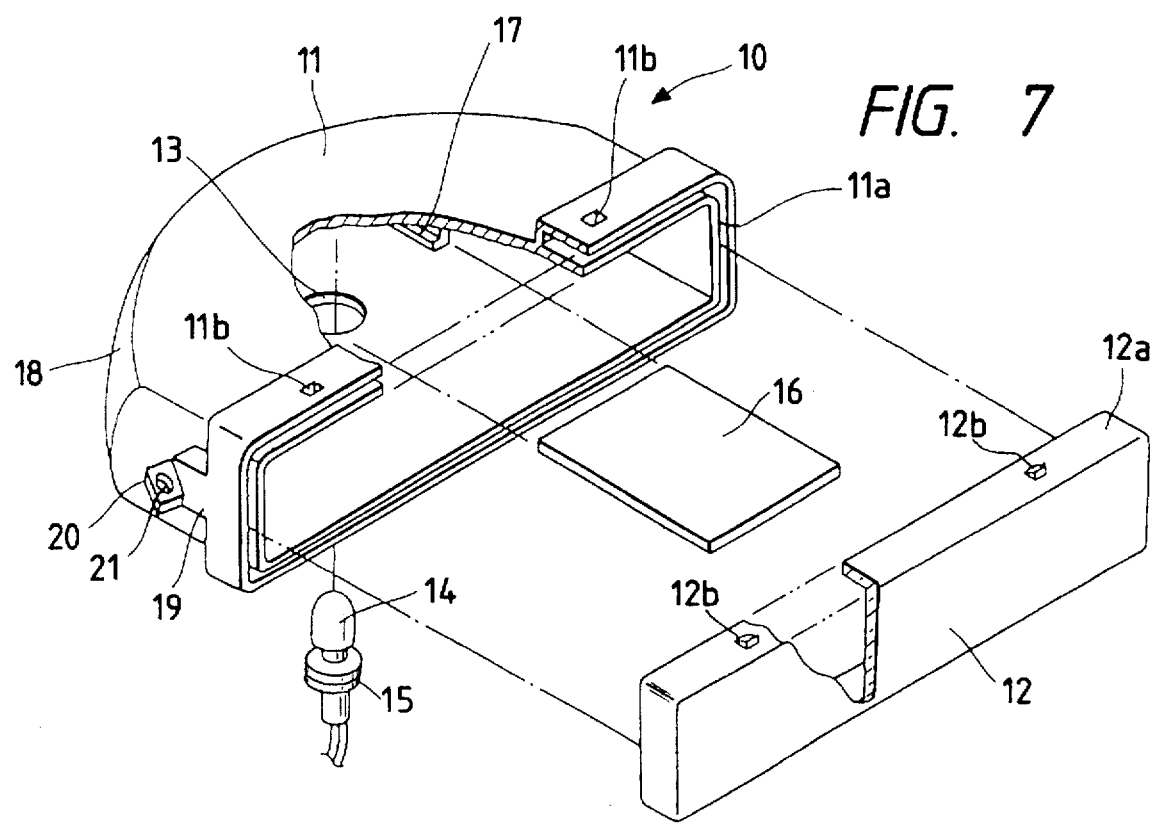
FIG. 7 is a partially exploded perspective view of the regenerative light source.

Further, reference numeral 10 denotes a regenerative light source 10 arranged on the rear parcel shelf 3 installed opposite to the hologram 5. The regenerative light source 10, which has a funnel-shaped body 11 having a laterally long, narrow front opening conforming with the shape of the hologram 5, and a red filter 12 fitted to the front opening of the body 11, forms a housing as shown in a partially cutaway top view in FIG. 6 and a partially exploded perspective view in FIG. 7. In this case, a groove 11a is formed over the entire periphery of the opening edge of the body 11, and the peripheral portion 12a of the red filter is fitted in the groove 11a. Moreover, lances protruding at a plurality of places along the peripheral portion 12a of the filter are fitted into holes 11b in the outer side of the recessed groove 11a, so that the regenerative light source 10 and the body 11 are integrated.

One side of the body 11 has a light-bulb receiving hole 13 formed therein. By inserting a socket 15 supporting a light bulb 14 in the light-bulb receiving hole 13, the light bulb 14 is mounted at a desired position within the body 11. A protector 16 made of metal or the like is supported by a guide 17 extending on the inside of the body 11 just above the light bulb 14, whereby the body 11 is prevented from being damaged by heat radiating from the light bulb 14. The rear portion of the body 11 is substantially in the form of a paraboloid of revolution. A metal film of aluminum, for example, is formed on the inside thereof to form a reflector 18 for reflecting light from the light bulb 14 toward the front opening.

A box-like hollow portion 19 is integrally formed over both outer sides of the body 11 in such a way as to protrude therefrom, and a flange 20 is installed at a desired angle with respect to the front opening on the outside of the box-like portion 19. Bolt holes 21 are formed in the flange 20 to fit the body 11 to the automobile.

Figure 8:
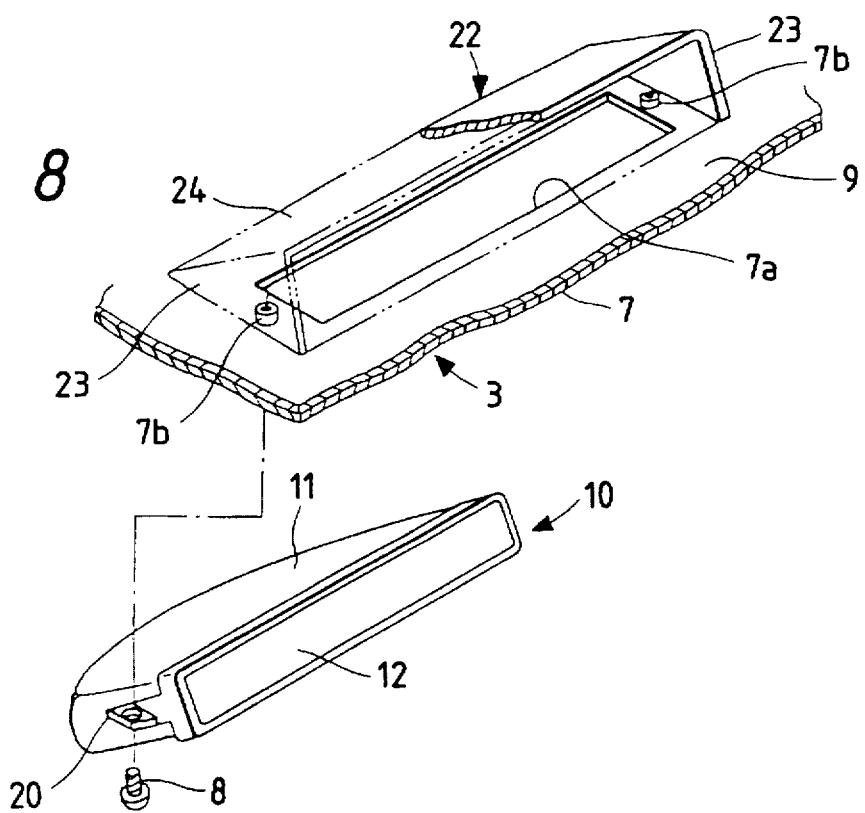
FIG. 8 is a perspective view of a regenerative light source to be fitted to a rear parcel shelf.

As shown in the perspective view of the regenerative light source 10 to be fitted to the rear parcel shelf 3 of FIG. 8, a square opening 7a for accommodating the regenerative light source 10 in a horizontally extending body panel 7 is formed in the rear parcel shelf 3 of the automobile. The front side of the regenerative light source 10 is inserted from below the opening in such a manner that its front part protrudes upward from the body panel 7. Further, tap holes 7b are provided in both end portions of the square opening 7a, and the flange 20 of the regenerative light source 10 is fitted to the body panel 7 by means of screws screwed into the respective tap holes 7b. Since the flange 20 is formed at the predetermined angle with the front of the regenerative light source 10, the regenerative light source 10 is fitted in such a state that it is tilted backward with respect to the horizontal plane of the body panel 7. Substantially half the front side of the regenerative light source 10 is exposed above the body panel 7, whereas half the rear side thereof is buried in the body panel. With this arrangement, the red filter 12 of the regenerative light source 10 is positioned opposite the hologram 5 fitted to the rear window glass 2.

A decorative panel 9 for decorating the rear parcel shelf 3 by covering the upper side of the body panel 7 is partially folded up along the peripheral edge of the square opening 7a to form a shielding wall 22, and the upper edge 22a of the shielding wall 22 is extended up to a position close to the inside of the rear window glass 2. Both sides 23 of the shielding wall 22 extend substantially upright, but its front portion 24 is inclined backward in agreement with the tilted body of the regenerative light source 10.

With this arrangement, the light emitted by the light bulb 14 directly, or otherwise after being reflected from the reflector 18, permeates through the red filter 12 fitted to the front opening and is emitted from the regenerative light source 10 as red light. The red light is projected onto the hologram 5 and permeated therethrough, whereby a red holographic image can be observed from behind the rear window glass 2. Thus the HMSL functions as intended.

As shown by arrows in FIG. 5, part of the red light, particularly the light emitted from the peripheral portion of the front opening of the regenerative light source 10, is reflected from the hologram 5 and the back as well as the surface of the rear window glass 2, and the light thus reflected is directed forward, that is, toward the driver. However, the presence of the shielding wall 22 formed by folding up the decorative panel 9 in order to trap such light on the front and lateral sides of the regenerative light source 10 prevents the reflected light from proceeding in the forward of the automobile. Therefore, the reflected light is blocked from the driver's field of vision.

Although part of the red light is projected upon the rear window glass 2 around the hologram 5, the projected red light is absorbed by the black ceramic-coated film 6 and prevented from being reflected forward.

By employing the construction in which half the body 11 of the regenerative light source 10 is buried in the body panel 7 of the rear parcel shelf 3, the restriction of the rear visual field of the driver is eased.

FIGS. 9(a) and 9(b) are diagrams illustrating a comparison with a conventional HMSL 1A, of which FIG. 9(a) is an exemplary overall view and FIG. 9(b) is an enlarged view of the principal parts of the HMSL. As shown in these figures, the conventional HMSL 1A is configured with a red lens 32 fitted to the front opening of a body 31 with a light bulb 33 disposed therein, and the combination is placed on the surface of a rear parcel shelf 3A. When it is attempted in the conventional HMSL 1A to provide an equal light distribution, particularly to secure the radiation angle with respect to a point B on the trunk lid 100 of the automobile, the lower edge of the lens of HMSL 1A has to be positioned on a straight line L1 connecting the driver's eyes (the edge of the field of view reflected by the rearview mirror) and the point B. However, in order to obtain the desired light diffraction in the hologram according to the present invention, it is only required to position the lower edge of the hologram 5 on the straight line L1 and to cause the light from the regenerative light source 10 to be projected onto the lower edge of the hologram 5. Consequently, the level of the regenerative light source 10 can be lowered. Therefore, the vertical dimension H2 occupied by HMSL 1 on the rear parcel shelf may be smaller than the height H1 required for the conventional HMSL 1A. The angle at which the driver's rear field of vision is obstructed because of the presence of the HMSL can be reduced from θ1 to θ2 or less.

Figure 10:
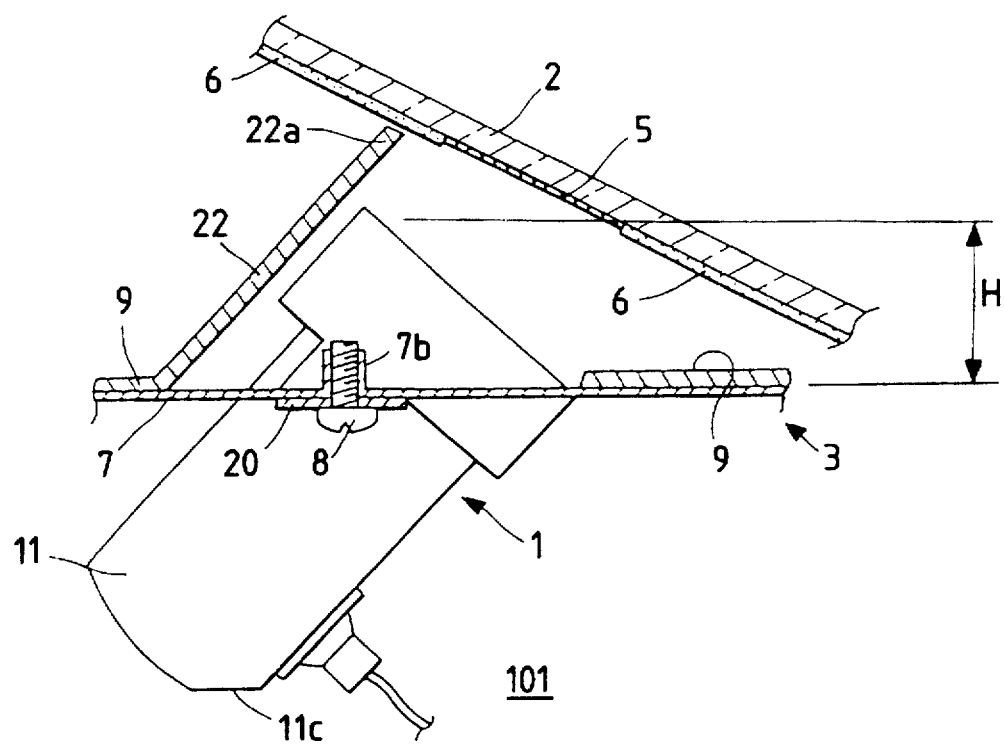
FIG. 10 is a sectional view of an HMSL according to a second embodiment of the invention.

According to the second embodiment of the invention as shown in FIG. 10, the flange 20 fitted to the body 11 of the regenerative light source 10 is arranged close to the front opening, so that the most part of the body 11 is buried in the body panel 7 when fitted to the body panel 7 of the rear parcel shelf 3. Even in this case, part of the decorative panel 9 of the rear parcel shelf 3 is folded up to form the shielding wall 22 to the extent that its upper edge 22a is extended close to the inside of the rear window glass 2.

With this arrangement, most of the body 11 of the regenerative light source 10 is buried in the rear parcel shelf 3, and the vertical dimension of the portion protruding from the rear parcel shelf 3 is reduced, so that the driver's field of vision can be improved further. Since the shielding wall 22 is installed around the regenerative light source 10, baggage or the like placed on the rear parcel shelf 3 can never block the light irradiating the hologram. Thus the light is never shielded.

The first embodiment is advantageous in that the driver's rear field of vision is enlarged. However, the amount of protrusion of the body 11 toward the trunk 101 is increased, and consequently the first embodiment of the invention is superior to the second one as to the amount of trunk space.

In either case, the dimension of the protrusion of the body 11 into the trunk 101 may slightly be reduced by cutting of the lower edge of the body 11, as shown in FIG. 10.

Figure 11:
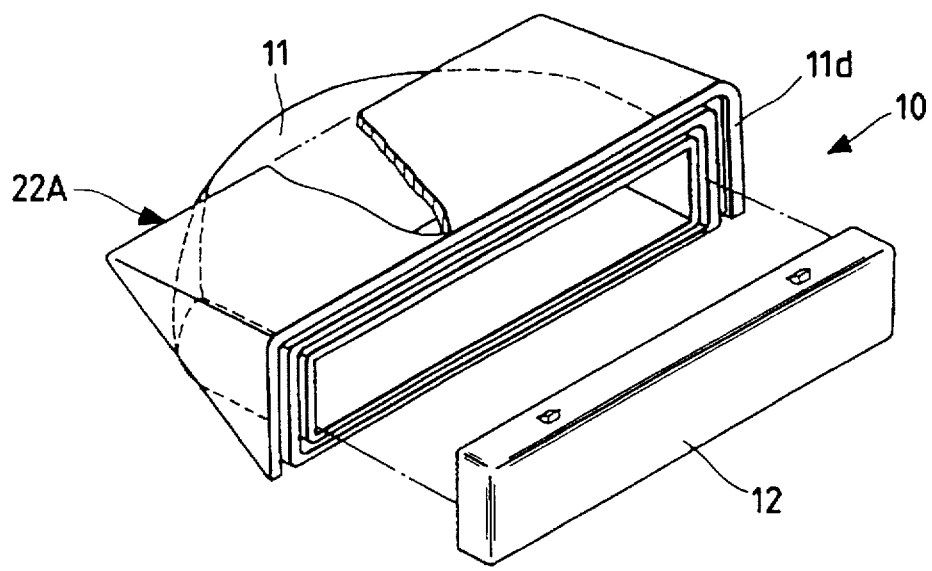
FIG. 11 is a partially cutaway perspective view of a regenerative light source for use in a third embodiment of the invention.
Figure 12:
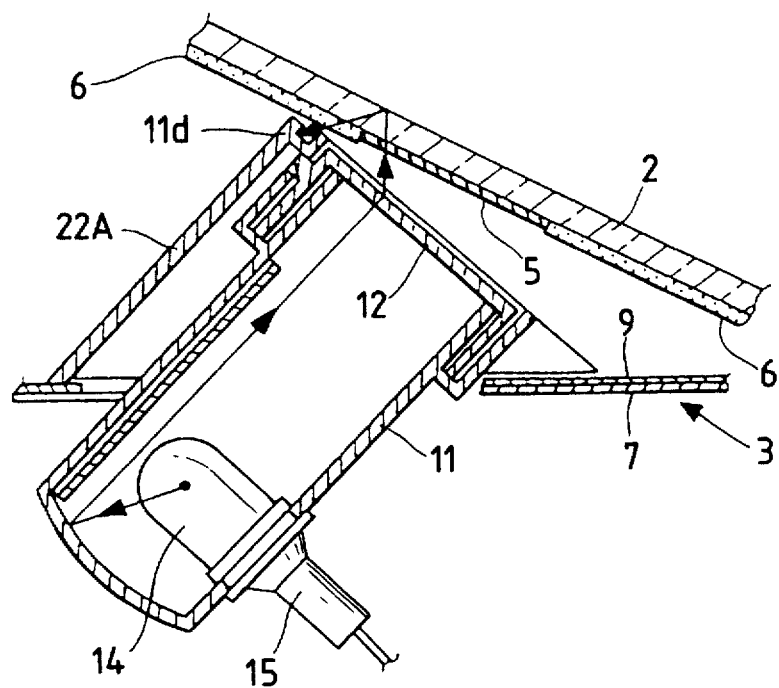
FIG. 12 is a sectional view of the HMSL according to the third embodiment of the invention.

FIG. 11 is a perspective view of a regenerative light source according to the third embodiment of the invention. The regenerative light source 10 and a shielding wall 22A are integrally formed in this example. More specifically, a portion 11d which slightly projects outward from the outer edge of the recessed groove 11a in the front opening of body is provided on one side and both edge faces of the body 11, and an apron-like shielding wall 22A extending from the leading edge of the projecting portion 11d along the outside of the body 11 is integrally formed.

As in the case of the first embodiment of the invention, the regenerative light source 10 is inserted from the upper side into the square opening 7a in the body panel 7 of the rear parcel shelf 3 and secured with bolts or the like. That is, the shielding wall 22A combined with the body 11 covers the front and both sides of regenerative light source 10 without integrally forming the shielding wall and the decorative panel 9 of the rear parcel shelf 3. The regenerative light source 10 is thus surrounded with the rear window glass 2. Even when part of the light emitted from the regenerative light source 10 and projected onto the hologram 5 is reflected forward from the hologram 5 and the rear window glass 2 of the automobile, the shielding wall 22 and the projected portion 11d block off the light and prevent it from reaching the driver's eyes. The projecting portion 11d is in the form of a groove, which is capable of further preventing such light from being reflected toward the driver.

The light bulb 14 has been used as the regenerative light source 10 and the red filter 12 is caused to emit red light according to each of the above-described embodiments of the invention. However, a red color bulb or a red light-emitting diode together with a white transparent filter may also be used as the light source.

The vertical dimension H of the regenerative light source 10 is set substantially equal to that of the black ceramic-coated film 6 provided under the hologram 5 according to the second embodiment of FIG. 10. Consequently, the regenerative light source 10 is covered with the black ceramic-coated film 6 when the regenerative light source 10 is viewed from behind the automobile through the rear window glass 2. The red color lens or bulb as the regenerative light source is thus hidden from the outside, which improves the external appearance of the apparatus.

Figure 13:
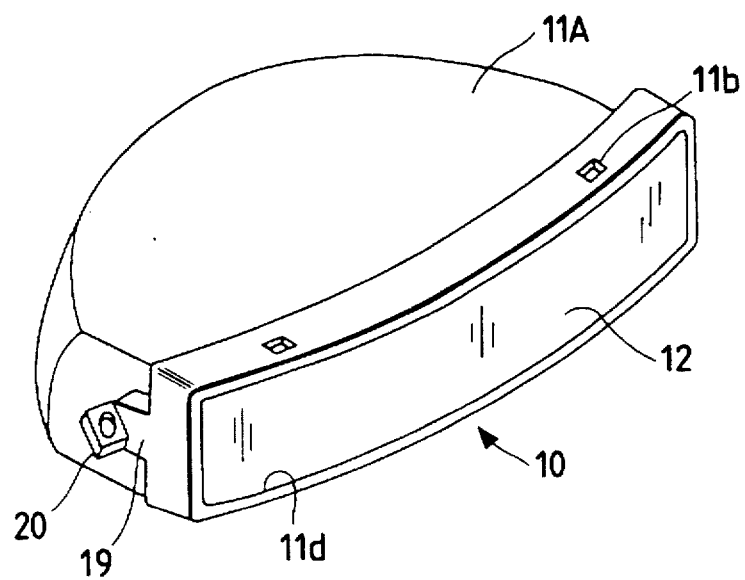
FIG. 13 is a perspective view of a regenerative light source according to a fourth embodiment of the invention.
Figure 14:
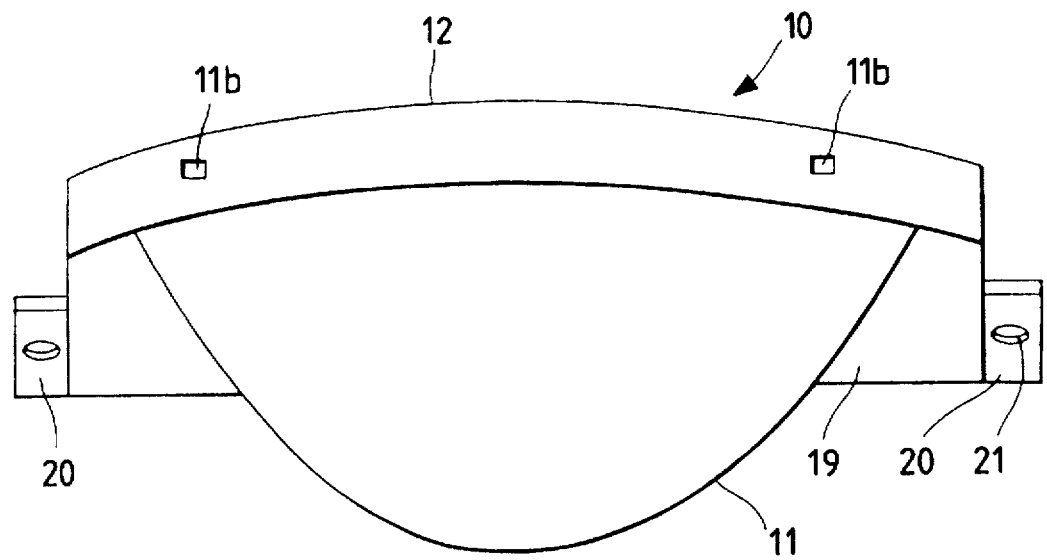
FIG. 14 is a top view of the regenerative light source according to the fourth embodiment of the invention.
Figure 15:
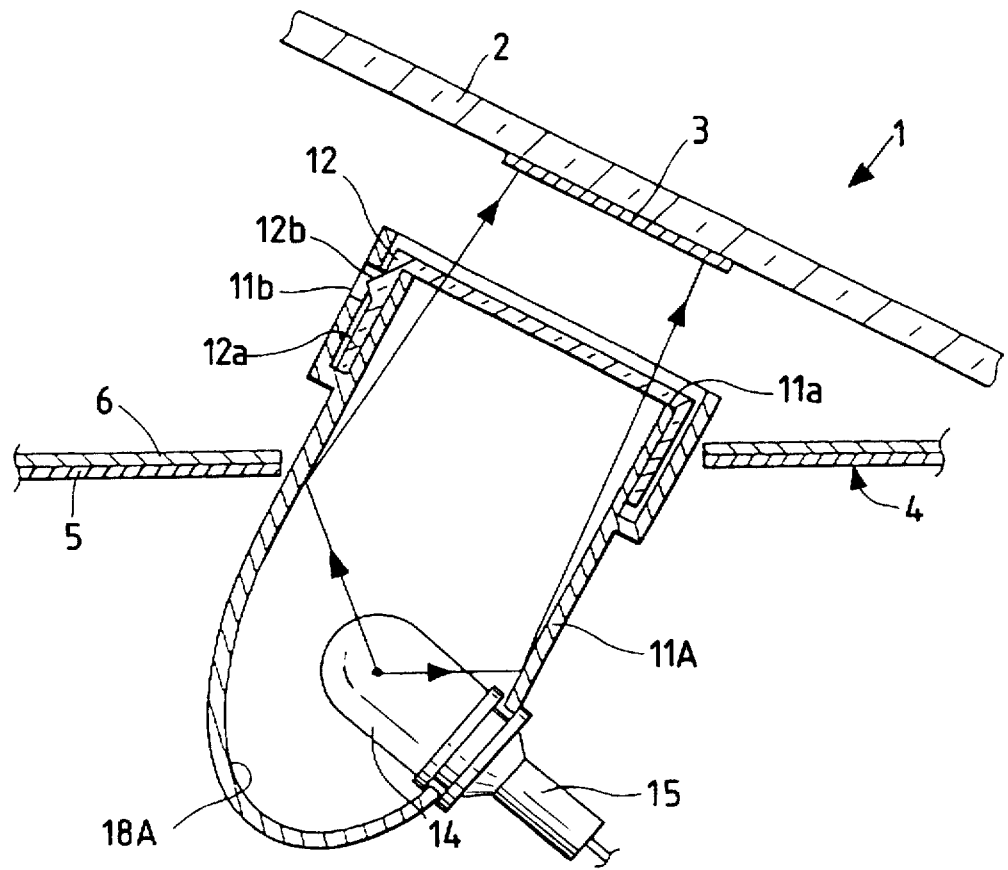
FIG. 15 is an enlarged sectional view of the HSML according to the fourth embodiment of the invention.
Figure 16:
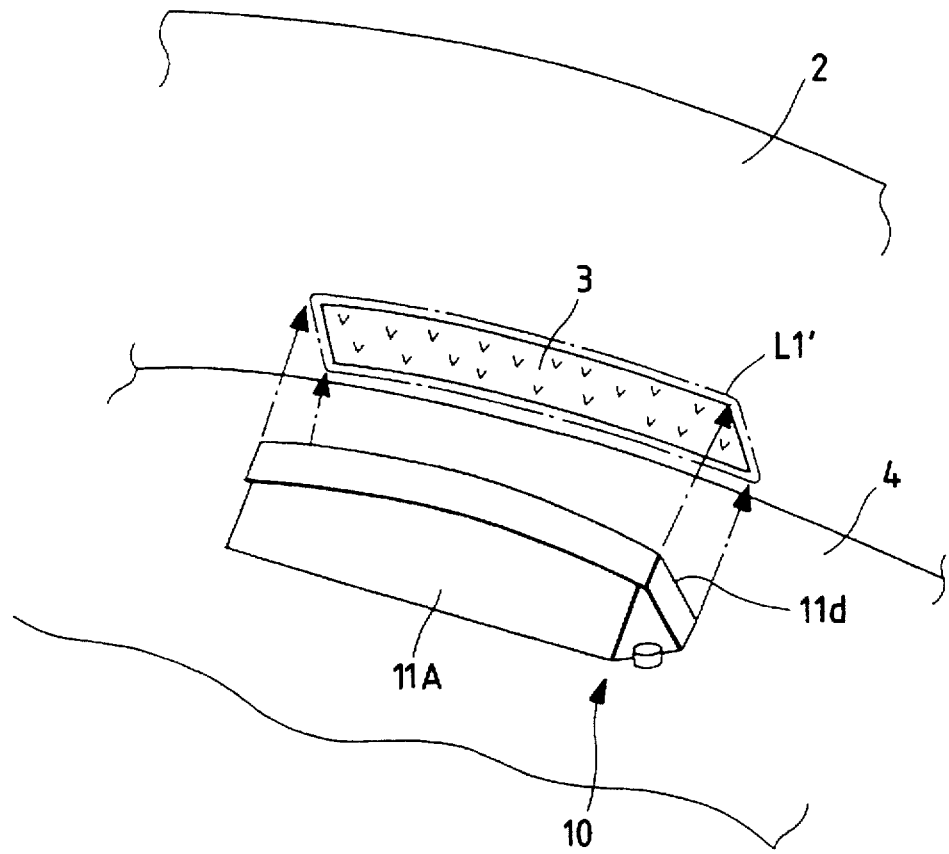
FIG. 16 is a diagram showing the relation between the hologram and the radiation pattern of the regenerative light source according to the fourth embodiment of the invention.

FIG. 13 is a perspective view of a regenerative light source according to the fourth embodiment of the invention. FIG. 14 is a top view thereof. FIG. 15 is an enlarged sectional view of HSML using the regenerative light source.

According to this embodiment of the invention, the vertical sectional configuration of a reflector 18A formed on a body 11A is arranged as a condensing reflector having an elliptic surface. The regenerative light source 10 is formed so that the central part of the opening 11d of its body 11A protrudes forward in a curved configuration. The opening 11d is also formed substantially opposite to the rear window glass 2 and in parallel therewith. The gap between the opening 11d and the rear window glass 2 is substantially equal anywhere therebetween.

With this arrangement, light from the light bulb 14 is first reflected from the reflector 18A and emitted from the opening 11d onto the hologram 3 adhered to the rear window glass 2. As the distance between the opening 11d and the rear window glass 2, that is, the hologram 3, is equal everywhere, a radiation pattern L1' due to the condensed light emitted from the opening 11d on the surface of the rear window glass has a uniform vertical dimension along the hologram 3. Therefore, the radiation pattern of the light L1' emitted from the regenerative light source 10 and the surface of the hologram 3 are aligned with one another, thus leaving no nonradiated region and ensuring that the hologram 3 is uniformly irradiated with light from the regenerative light source 10. Moreover, the light is prevented from being emitted rearward through the rear window glass 2 outside the hologram 3 which would obstruct the recognition of the regenerated image of the hologram. That is, the visual recognizability of the HMSL 1 is increased and degradation of its external appearance is prevented.

Figure 17:
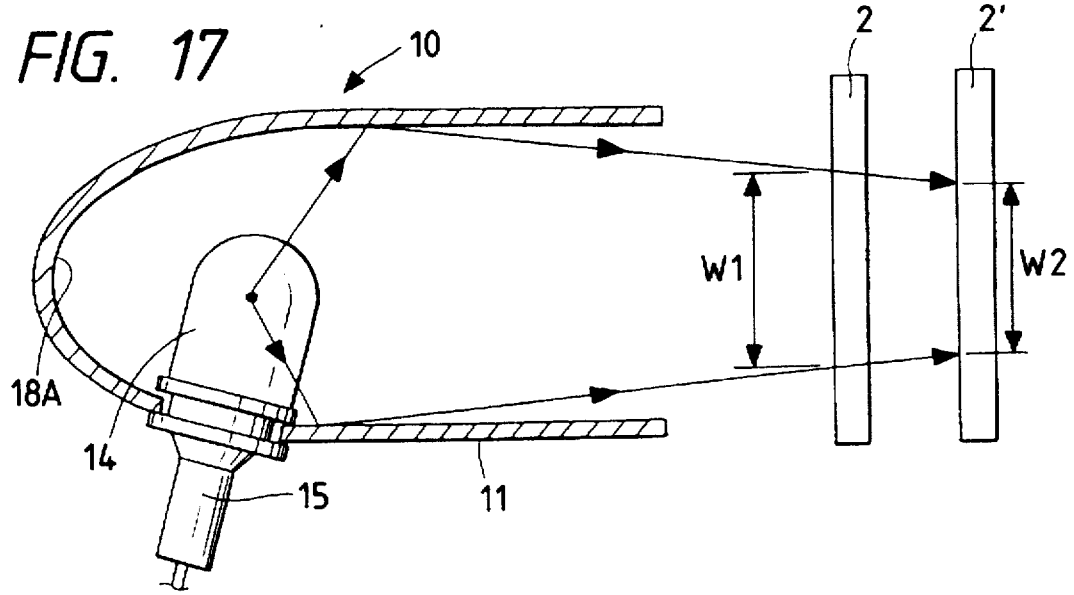
FIG. 17 is an exemplary sectional view showing variations in the width of the radiation pattern due to differences in distance between the regenerative light source and the hologram according to the fourth embodiment of the invention.

In the case of the condensing regenerative light source 10 according to the fourth embodiment of the invention, the vertical pattern widths W1, W2 of the irradiated light are different from one another because of the condensing properties of light, as shown by 2, 2' in FIG. 17, if the distance between the opening 11d of the body 11A and the rear window glass 2 partially varies. In such a case it is impossible to effect irradiation with a uniform vertical pattern breadth over the whole width of the hologram.

Since the opening 11d of the body 11A is parallel with the rear window glass 2 according to this embodiment of the invention, the two ends of the body are prevented from interfering with the rear window glass even though the regenerative light source 10 is set as close to the rear glass, unlike the regenerative light source 10 whose opening is straight. Consequently, the area occupied by the rear parcel shelf where the regenerative light source 10 is installed can be reduced.

A description has been given of examples of HMSLs using holograms according to the preceding embodiments of the invention. However, the same effects can be achieved using a diffraction grating in place of the hologram.

Moreover, the hologram can be irradiated with light from the regenerative light source with efficiency by setting the width of the opening of the regenerative light source greater or smaller than that of the hologram. In other words, light from the regenerative light source can totally be emitted onto the hologram by enlarging the hologram. On the other hand, the whole surface of the hologram can be irradiated with light by making the hologram smaller. The hologram image can be regenerated in either case by using all of the light of the regenerative light source or utilizing the whole surface of the hologram. The efficiency of image regeneration can thus be enhanced.

Figure 18:
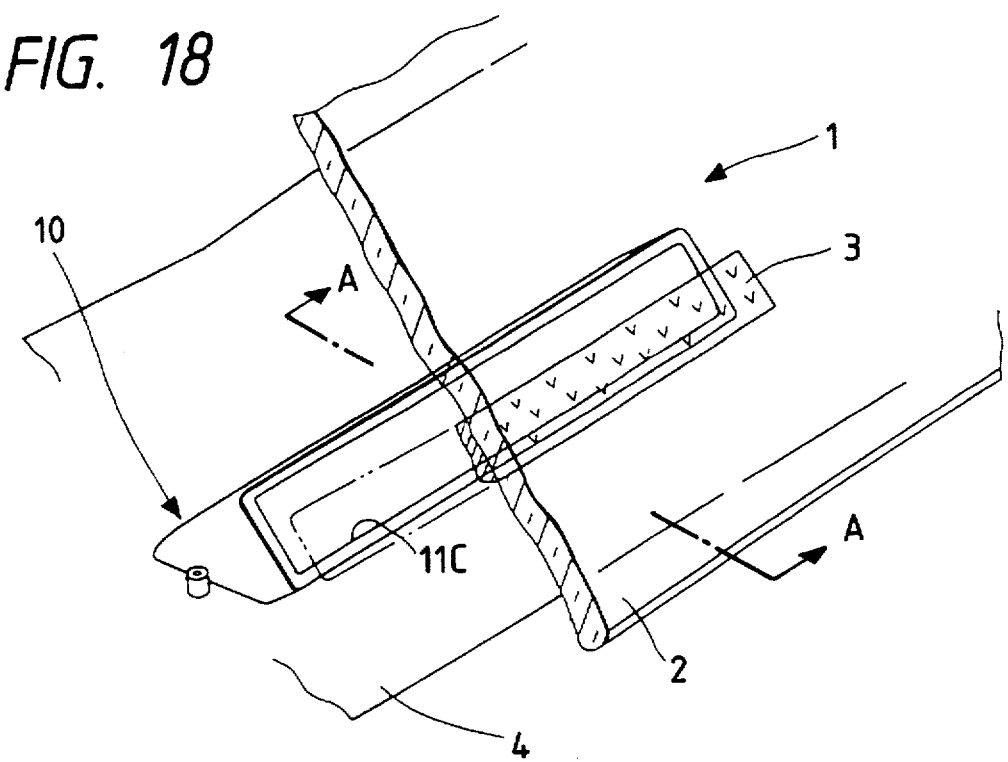
FIG. 18 is a partially cutaway perspective view of an HMSL according to a fifth embodiment of the invention.
Figure 19:
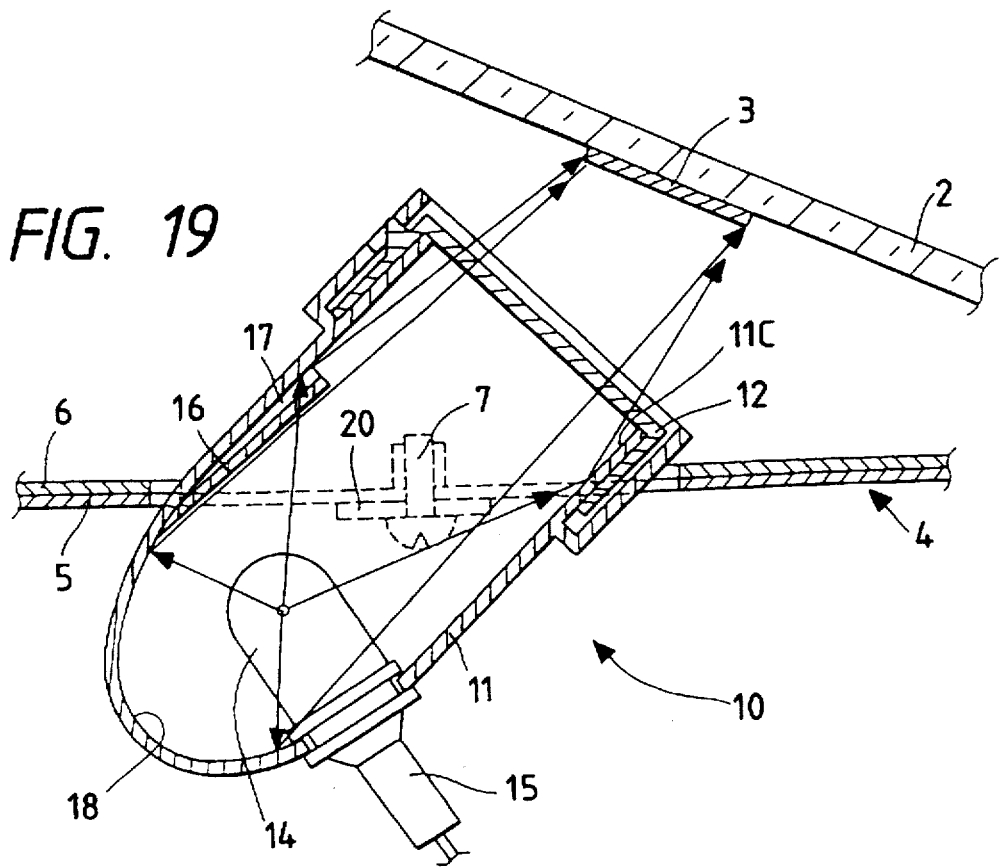
FIG. 19 is an enlarged sectional view taken on a line A—A in FIG. 18.

FIG. 18 is a partially cutaway perspective view of an HMSL according to the fifth embodiment of the invention. FIG. 19 is an enlarged sectional view taken on a line A—A in FIG. 18. In these drawings, the HMSL 1 is provided with the hologram 3 in the form of a laterally long, narrow film which is integrally bonded to the inside of the rear window glass 2 along the lower edge in its central part.

Figure 20:
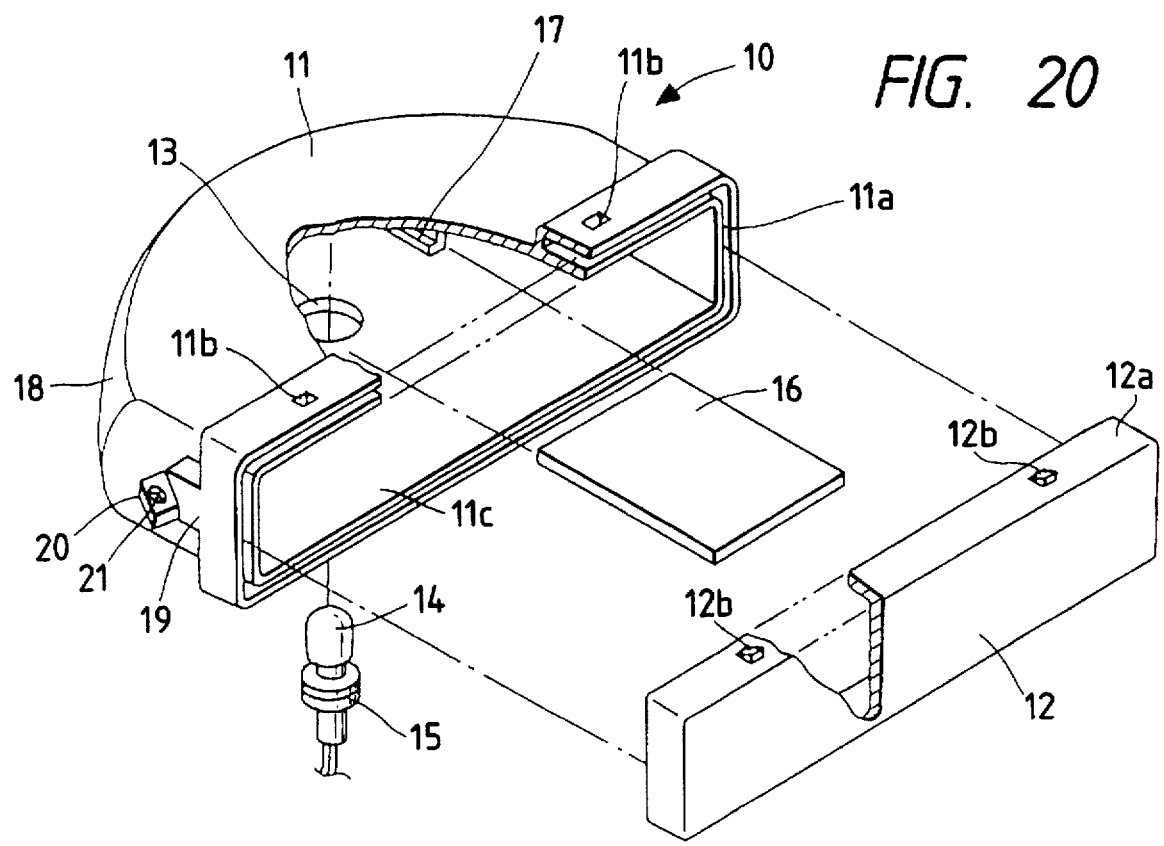
FIG. 20 is a partially exploded perspective view of the regenerative light source.

A regenerative light source 10 is located opposite the hologram 3. As shown in FIG. 20, the regenerative light source 10, has a funnel-shaped laterally long, narrow body 11 and a red filter 12 fitted to the front opening of the body 11, forming a housing. A groove 11a is formed along the entire periphery of the opening edge of the body 11, and the peripheral portion 12a of the red filter is fitted in the groove 11a. Moreover, lances protruding at a plurality of locations along the peripheral portion 12a of the filter are fitted into holes 11b in the outer side of the groove 11a, so that the regenerative light source 10 and the body 11 are integrated.

Further, one side of the body 11 has a light-bulb receiving hole 13 therein. By inserting a socket 15 for supporting a light bulb 14 in the light-bulb receiving hole 13, the light bulb 14 is placed at the desired position within the body 11. A protector 16 made of metal or the like is supported by a guide 17 extending along the inside of the body 11 just above the light bulb 14, whereby the body 11 is prevented from being damaged by heat radiating from the light bulb 14.

Figure 21:
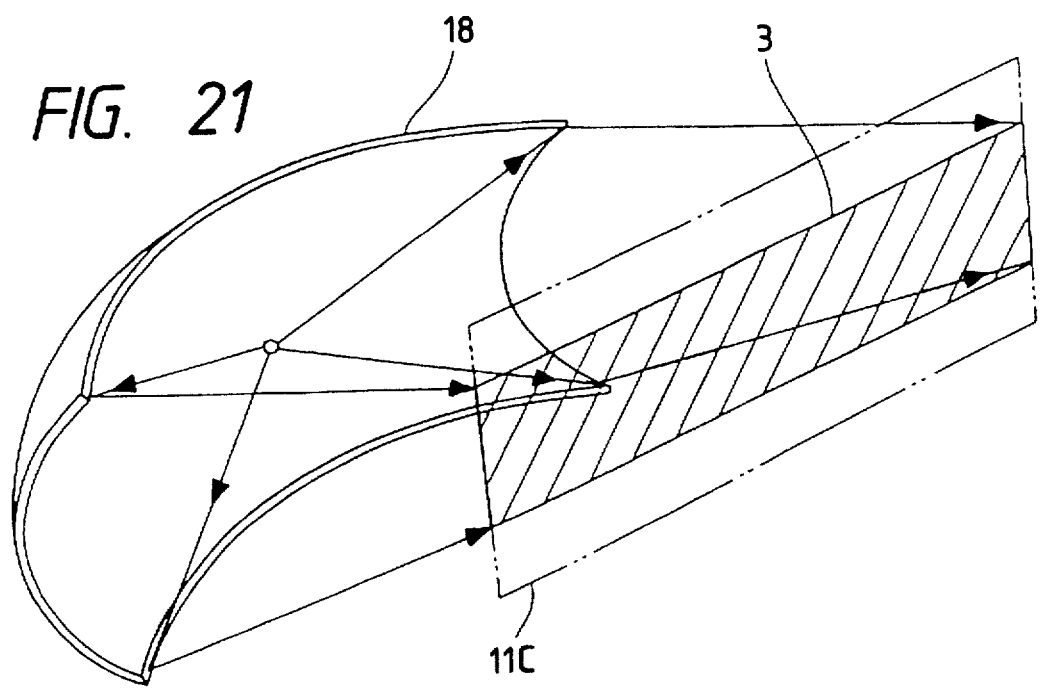
FIG. 21 is an exemplary perspective view of a reflector in the regenerative light source.

The rear of the body 11 is, as shown exemplarily in FIG. 21, substantially in the form of a paraboloid in lateral cross section and elliptical in vertical cross section, and a metal film of aluminum, for example, is formed on the inside thereof to form a reflector 18 for reflecting light from the light bulb 14 toward an opening 11c as parallel rays of light in the horizontal direction and condensing light in the vertical direction.

In this case, the lateral dimension of the opening is set equal to the horizontal width of the hologram 3, whereas the vertical dimension thereof is made greater than the height of the hologram 3.

A box-like hollow portion 19 is, as shown in FIG. 20, integrally formed over both outer sides of the body 11 in such a way as to protrude therefrom, and the flange 20 is installed at a desired angle with respect to the front opening on the outside of the box-like portion 19. Bolt holes 21 are formed in the flange 20 to fit the body 11 to the automobile.

The regenerative light source 10 thus constructed is fitted in a square opening in the body panel of the rear parcel shelf 4. As shown by a broken line, the flange 20 of the regenerative light source 10 is fitted to the body panel 5 by screws screwed into the tap holes in the body panel 5. The body 11 is fitted in such a way that it is inclined rearward with respect to the horizontal plane of the body panel 5. The red filter 12 at the opening of the regenerative light source is placed opposite the hologram 3 on the rear window glass 2 and slightly set apart from the rear window glass 2.

A decorative panel 6 for decorating the rear parcel shelf 4 is provided on the upper side of the body panel 5.

With this arrangement of the HMSL 1, light emitted from the light bulb 14 directly, or otherwise after being reflected from the reflector 18, permeates through the red filter 12 fitted to the front opening as parallel rays of light in the horizontal direction and condensing light in the vertical direction, and is emitted from the regenerative light source 10 as red light. The red light is projected onto the hologram 5 and permeated therethrough, whereby a red hologram image can be observed from behind the rear window glass 2. Thus the HMSL functions as intended.

Since the condensing light is emitted from the regenerative light source 10 particularly in the vertical direction to irradiate the long, narrow hologram which is small in vertical dimension, all of the light emitted through the opening 11c, which is larger than the hologram 3, can be irradiated onto the hologram 3. Consequently, despite the fact that the height of the hologram 3 is reduced so as to improve the external appearance, the emission of a large quantity of light becomes possible. As a result, the holographic image is made brighter and visual recognizability is increased. Thus, the inventive HMSL can satisfy standard requirements.

Figure 22:
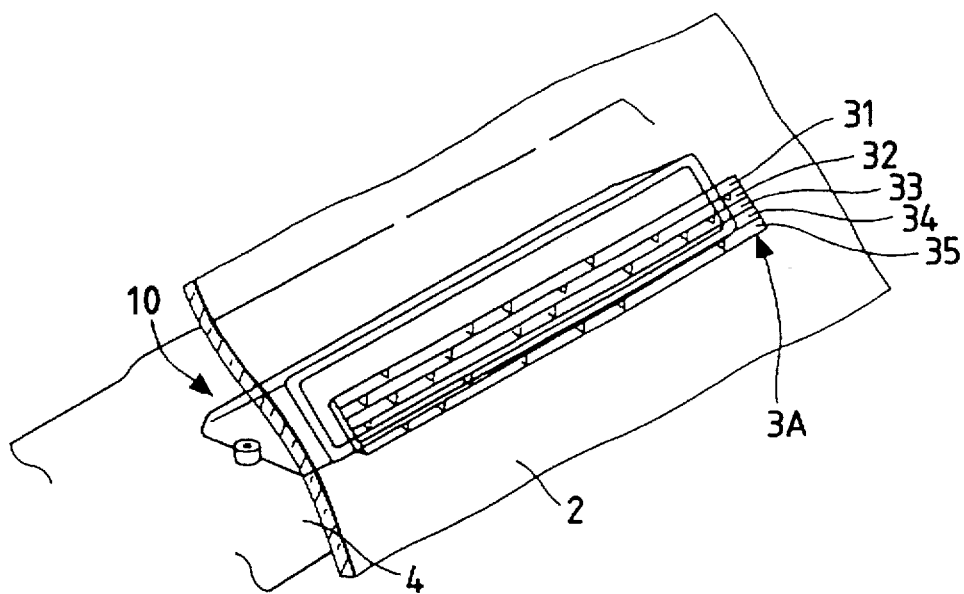
FIG. 22 is a partially cutaway perspective view of an HMSL according to a sixth embodiment of the invention.
Figure 23A:
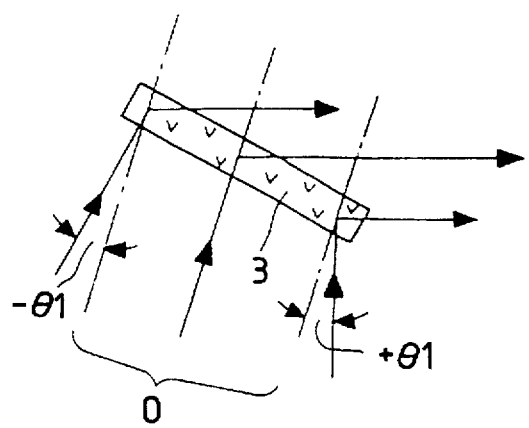
FIG. 23(a) is an exemplary diagram of a hologram used to explain the problems which may arise in an HMSL.
Figure 23B:
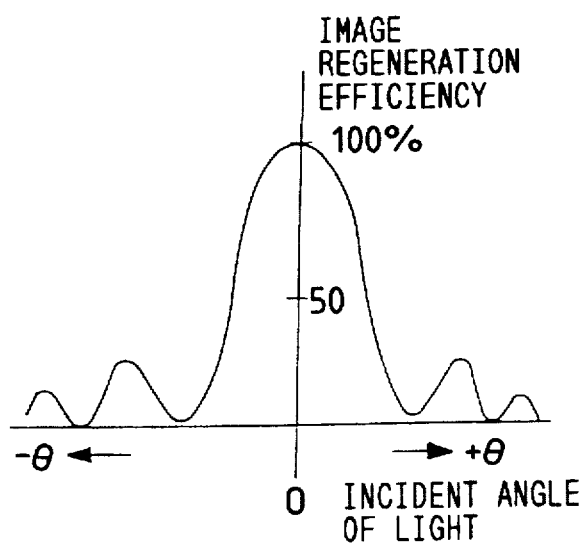
FIG. 23(b) shows characteristics of angles of incident light together with image regeneration efficiency.

FIG. 22 is a partially cutaway perspective view of an HMSL according to the sixth embodiment of the invention. A condensing regenerative light source is used in the fifth embodiment of the invention. The use of such a regenerative light source may cause the incident angle of light to slightly shift. As shown in FIG. 23(a), rays of light coming off the optical axis 0 of the regenerative light source form a small angle with the optical axis, and consequently producing shifting of angles +θ1, −θ1 in both positive and negative directions with respect to the original incident angle of light on the hologram because the angle of the rays separated from the optical axis 0 of the regenerative light source forms a large angle with the optical axis. The hologram regenerates an image at a predetermined radiation angle with respect to a predetermined incident angle of light. If the incident angle shifts, the efficiency of image regeneration may be partially lowered. The image brightness in the direction of a specific radiation angle of light may become insufficient. FIG. 23(b) is a characteristic diagram showing the relation between the incident angle of light and the image regeneration efficiency.

Figure 24:
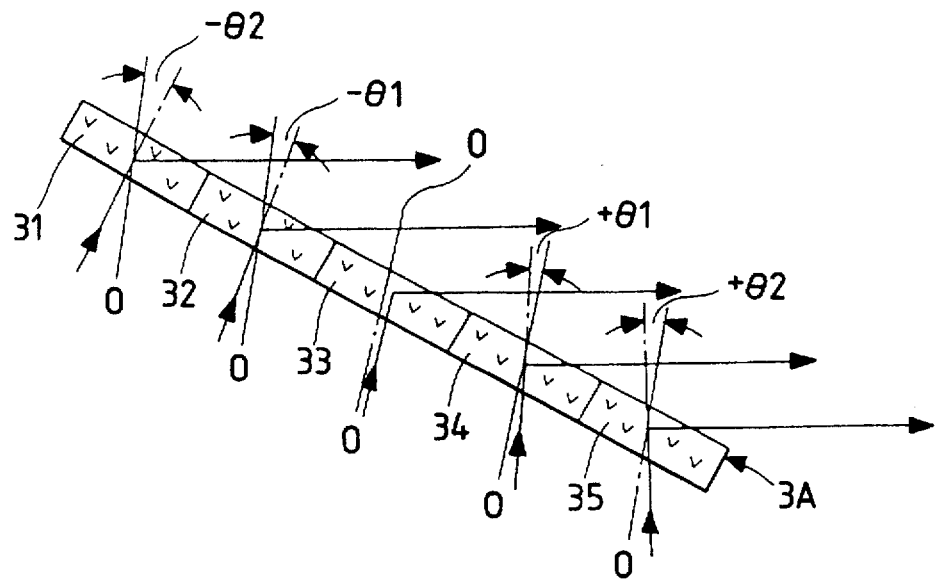
FIG. 24 is an exemplary structural sectional view of a hologram according to the sixth embodiment of the invention.

According to the sixth embodiment of the invention, a hologram 3A is vertically divided into a plurality of regions as shown in FIG. 22. More specifically, as shown in FIG. 24 in detail, laterally five small holograms 31–35 are vertically arranged, and these are integrated into one hologram 3. Each of the holograms 31–35 is also arranged so that its incident angle of light set according to its characteristics corresponds to the inclination of rays of the condensing regenerative light source. The central subdivided hologram 33 is set at an incident angle of θ0 as prescribed, and incident angles of light on the subdivided holograms 32, 34 and 31, 35 centered around the hologram 33 are sequentially increased to, for example, −θ1, +θ1, −θ2, +θ2 in both positive and negative directions.

These holograms may be formed through the steps of subdividing a plurality of holograms formed at different incident angles beforehand, taking a part of subdivided holograms out of each hologram, and bonding them together into one body. Otherwise, a thin slit mask is employed with a single sheet hologram sheet, and while sequentially varying the incident angle, exposing the holograms.

When the hologram 3A is used and when condensing light is emitted from the regenerative light source 10, the light is incident on the plurality of subdivided holograms 31–35 constituting the hologram 3A at different incident angles of light centered around the optical axis 0. As a result, the image regeneration efficiency of the subdivided holograms 31–35 remains in the best range for a given radiation angle, so that image regeneration over the whole hologram is obtained with high efficiency. For this reason, the brightness of the regenerated holographic image is increased to the extent that the applicable HMSL standards can be met.

Although a description has been given of a hologram having a small height according to the fifth and sixth embodiments of the invention, the regenerative light source may have lateral light-condensing properties in the case of a longitudinally long hologram. In this case, according to the sixth embodiment of the invention, the subdivided holograms may be arranged laterally. Moreover, the hologram may be irradiated with condensing light in any one of vertical and horizontal directions, in which case small, rectangular subdivided holograms may be arranged in the form of cells according to the sixth embodiment of the invention.

Figure 25:
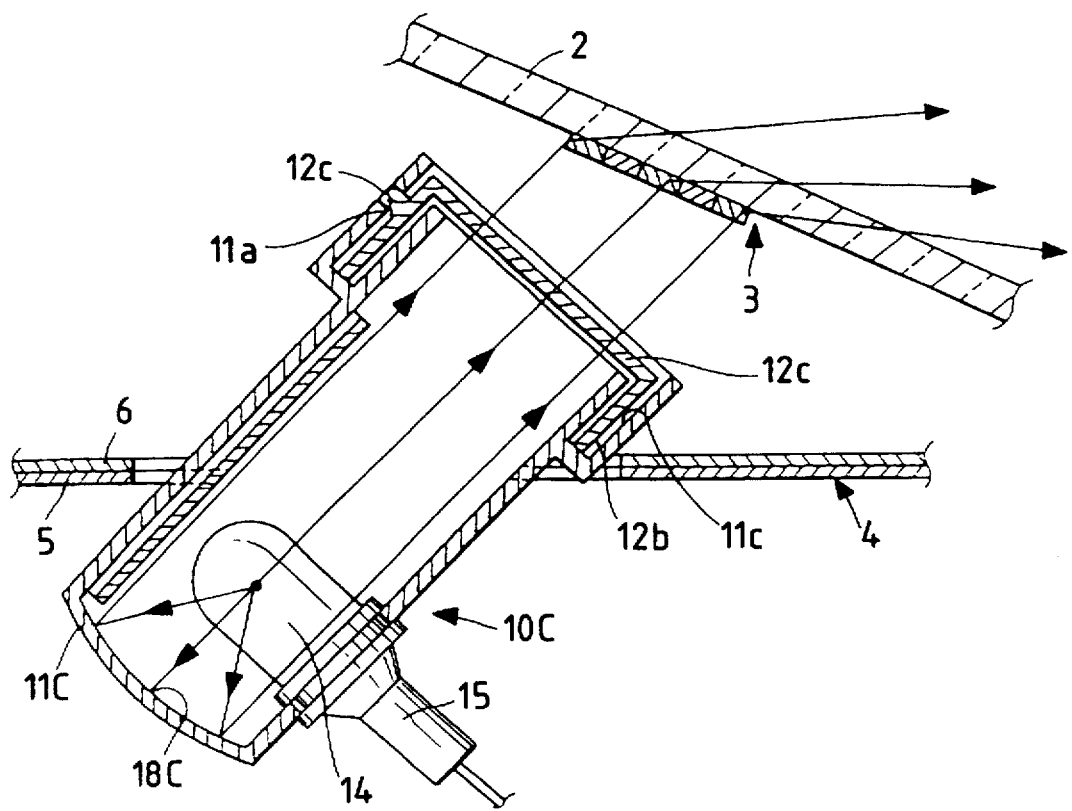
FIG. 25 is an enlarged sectional view of an HMSL according to the seventh embodiment of the invention.

FIG. 25 is a sectional view of an HMSL according to the seventh embodiment of the invention. The subdivided holograms 31–35 of the hologram 3 are arranged so that they are different in incident angles of light and image regeneration characteristics as in the case of FIG. 23(b). A regenerative light source 10C for radiating the hologram with parallel rays of light is employed in this case. With the provision of a parabolic reflector 18C fitted to the body 11C, parallel rays of light reflected from the reflector 18C are emitted through the opening of the body 11C and the hologram 3 is irradiated with the light permeated through a red filter 12C. The red filter 12C is installed in such a way that its peripheral portion 12B is first inserted in the groove 11c formed in the body 11C before the lances formed in that portion are fitted into the respective holes 11d in the body 11C.

Figure 26:
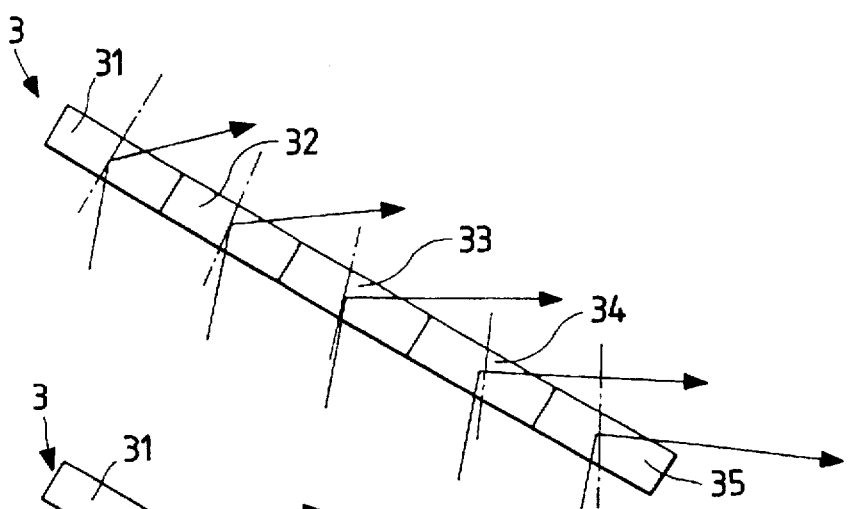
FIG. 26 is a diagram illustrating the structure of the hologram and the light incidence and emission state according to the seventh embodiment of the invention.

With this arrangement, the subdivided holograms 31–35 having different characteristics are irradiated with parallel rays of light as shown in FIG. 26, so that hologram images are regenerated by the subdivided holograms 31–35 at different radiation angles. At this time, the subdivided holograms 31, 32, 34, 35 centered around the central hologram 33 are used to regenerate images resulting from the vertical diffusion of light. Consequently, the regenerated image becomes vertically diffused with respect to the overall hologram 3, which makes it possible for the hologram image to be observed from behind the automobile over a wide range of vertical angles, thus increasing the visual recognizability of the HMSL.

Figure 27:
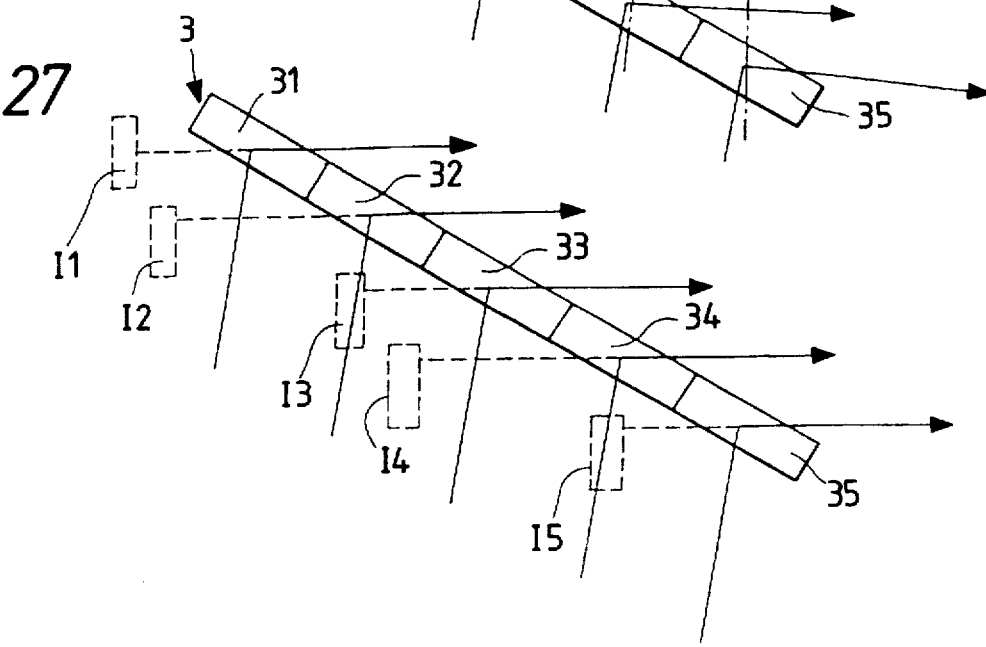
FIG. 27 is a diagram illustrating the structure of another example of a hologram and a condition of the regenerated image according to the present invention.

The hologram image is a regenerated virtual image at a position where it is normally viewed from behind the automobile. By forming a group of regenerated virtual images whose positions differ according to the vertically adjoining subdivided holograms 31–35, the positions of images 11, 13, 15 and 12, 14, for example, regenerated by the respective subdivided holograms 31, 33, 35 and 32, 34 are set different alternately and sequentially as shown in FIG. 27. Then the hologram image as viewed from behind the automobile looks as if laterally long, narrow images lined up vertically are shifted from each other alternately and sequentially. This image thus appears to have depth, whereby the visual recognizability of HMSL can be increased further.

Figure 28A:
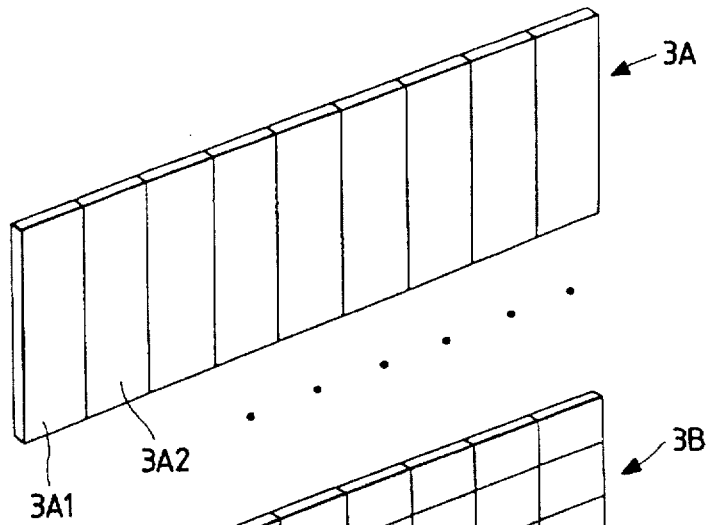
Figure 28B:
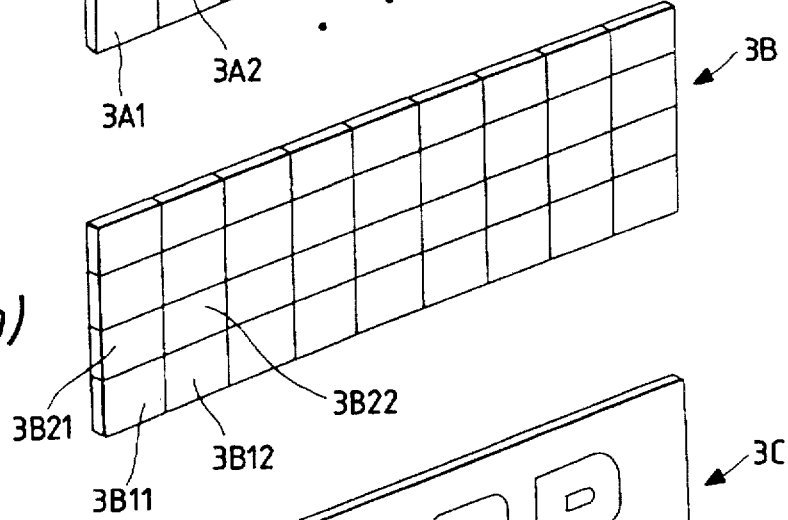

As shown in FIG. 28(a), moreover, vertically long subdivided holograms 3A1, 3A2, . . . may laterally be arranged by laterally subdividing the hologram 3A. As shown in FIG. 28(b) further, rectangular holograms 3B11, 3B12, . . . , 3B21, 3B22, . . . may otherwise be arranged in the form of cells by subdividing a hologram 3B vertically and laterally.

With respect of these subdivided holograms 3A, 3B, hologram images having depth can be regenerated with excellent visual recognizability by optionally differentiating the regenerated image positions of the subdivided holograms as in the preceding embodiments of the invention.

Figure 28C:
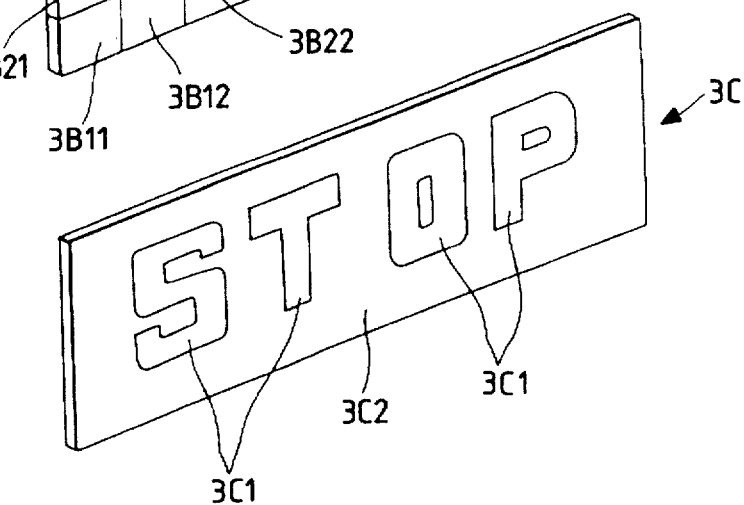

As shown in FIG. 28(c), further, the visual recognizability of a desired pattern may be increased by drawing the pattern on a hologram 3C and setting the positions of virtual images to be regenerated in patterns 3C1 different from that of a virtual image without such a pattern, making the pattern 3C1 stand out in bold relief.

Figure 29:
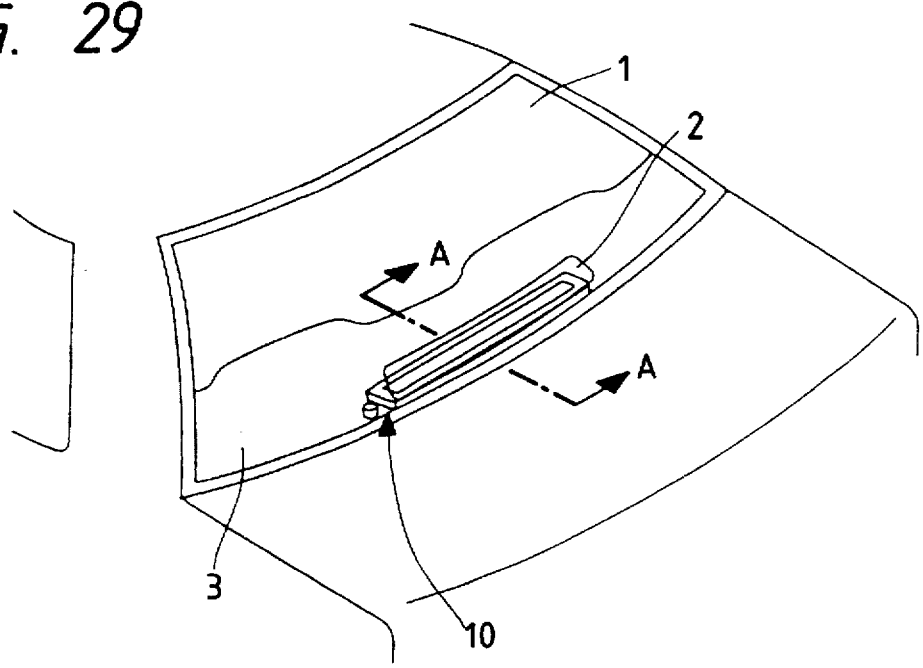
FIG. 29 is a schematic perspective view of a rear window glass as viewed from behind in an automobile equipped with an HMSL of the eighth embodiment of the invention.
Figure 30:
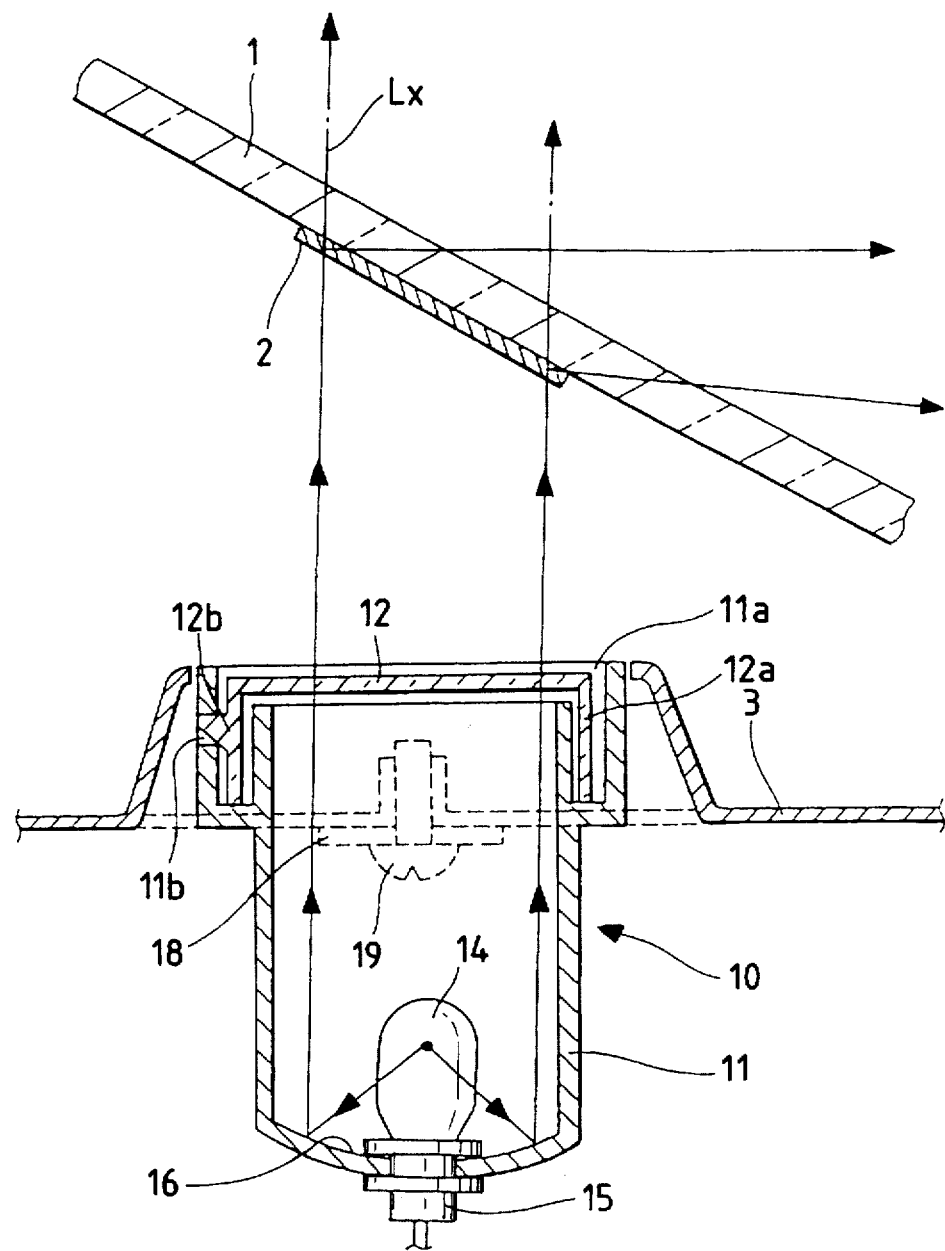
FIG. 30 is an enlarged sectional view taken on a line A—A in FIG. 29.

FIG. 29 is a schematic perspective view of a rear window glass as viewed from behind an automobile equipped with an HMSL according to the eighth embodiment of the invention. FIG. 30 is an enlarged sectional view taken on a line A—A in FIG. 29. As shown in these drawings, a hologram 2 is integrally joined to the inside along the lower edge of the central part of the rear window glass 1 of an automobile. The hologram 2 is made into a laterally long, narrow belt-like shape and is bonded to the inside of the rear window glass 1 with a transparent adhesive (not shown).

Figure 31:
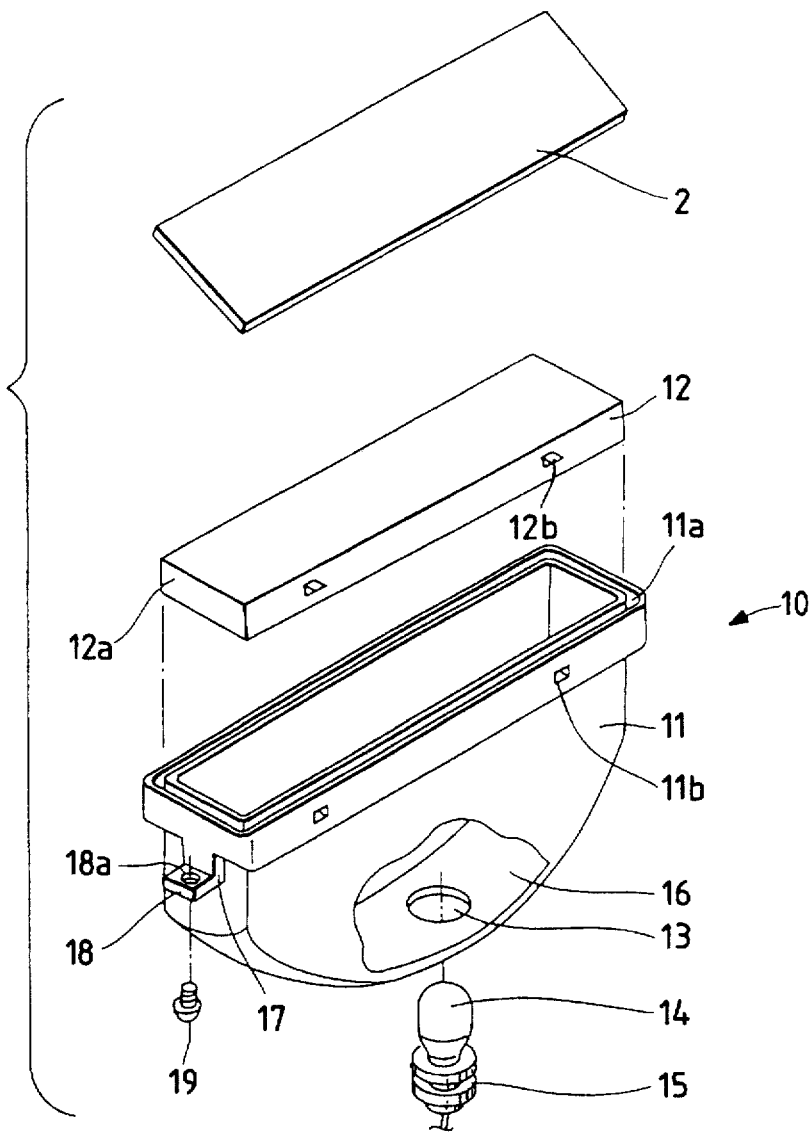
FIG. 31 is a partially cutaway perspective view of the regenerative light source.

On the other hand, the regenerative light source 10 is placed on the rear parcel shelf 3 located opposite the hologram 2. As shown in a partially exploded perspective view in FIG. 31, the regenerative light source 10, with the funnel-shaped body 11 having a laterally long, narrow front opening conforming with the shape of the hologram 2 and the red filter 12 fitted to the front opening of the body 11, forms a housing. In this case, the groove 11a is formed along the entire periphery of the opening edge of the body 11, and the peripheral portion 12a of the red filter is fitted in the recessed groove 11a. Moreover, lances protruding at a plurality of places along the peripheral portion 12a of the filter are fitted into the holes 11b in the outer side of the recessed groove 11a, so that the regenerative light source 10 and the body 11 are integrated. Further, by inserting the socket 15 for supporting the light bulb 14 into the light-bulb receiving hole 13, the light bulb 14 is placed at the desired position within the body 11. The rear of the body 11 is substantially in the form of a paraboloid of revolution, and a metal film of aluminum, for example, is formed on the inside surface thereof to form a reflector 18 for reflecting light from the light bulb 14 toward the front opening.

A box-like hollow portion 17 is integrally formed over both outer sides of the body 11 in such a way as to protrude therefrom, and a flange 18 is installed at a desired angle with respect to the front opening on the outside of the box-like portion 17. Bolt holes 18a are formed in the flange 18.

As shown in FIG. 30, the regenerative light source 10 with the rear portion of the housing buried in the long, narrow recess in the rear parcel shelf 3 is secured to the panel of the rear parcel shelf 3 by means of screws 19 screwed into the bolt holes 18a of the flange 18. The regenerative light source 10 is installed in such a way that the filter 12 faces upward directly below the hologram 2, that is, the optical axis of the regenerative light source 10 points upward at right angles to the automobile.

With this arrangement, the light emitted from the light bulb 14 is directly or otherwise reflected by the reflector and permeated through the red filter 12 before being radiated from the regenerative light source 10. The red light is perpendicularly projected onto the hologram 2 and diffracted by the hologram 2 so that a red hologram image can be observed from behind the rear window glass 1, that is, observed by the driver of the following car. Thus the HMSL functions as intended.

Figure 32A:
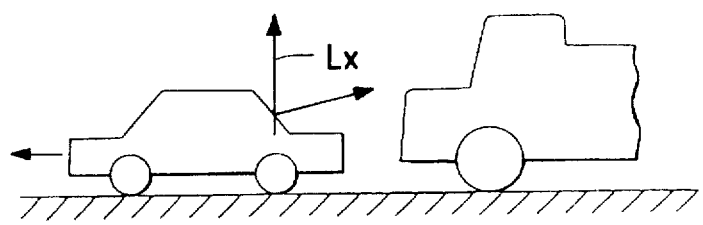
FIGS. 32 (a) and 32(b) are schematic diagrams illustrating an angle of the regenerative light source to be installed according to the present invention.
Figure 32B:
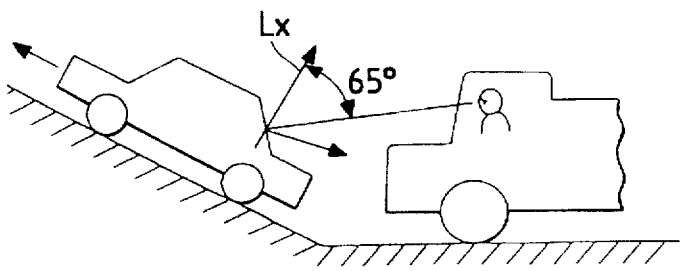

As shown by a chain line in FIG. 30, part of the red light emitted by the regenerative light source 10 then permeates through the hologram 2 and the rear window glass 1 without being diffracted in the hologram 2, and is emitted in the direction perpendicular to the automobile. As shown in FIG. 32(a), further, the light perpendicularly permeating through the hologram 2, that is, the directly permeated light Lx, is prevented from coming into the following driver's field of view and dazzling the driver. Since the directly permeated light is perpendicularly directed upward as shown in FIG. 32(b), it is prevented from dazzling the following driver, even if the following car is of a tall type and the preceding car is climbing up a sloping road.

The present inventors have made a more detailed study of gradients of sloping roads including mountain roads and discovered that there is substantially no fear of dazzling the following driver, even if the following car is of a tall type such as a truck, because it is only required to take a gradient of about 28° into consideration as the maximum gradient on the condition that the angle of the directly permeated light Lx does not exceed at least about 65° with respect to the rearward direction.

By this is meant that the optical axis of the regenerative light source need not necessarily be directed perpendicularly upward. The HMSL of this embodiment is thus capable of preventing the following car driver from be dazzled as long as the maximum angle of the optical axis is set to 65° or smaller.

Figure 33:
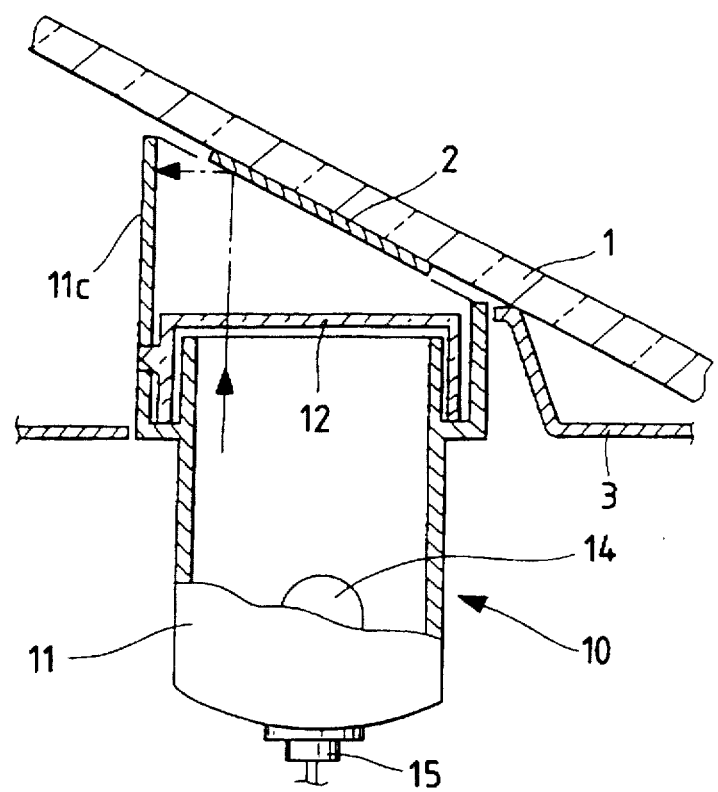
FIG. 33 is a sectional view of a ninth embodiment of the invention.

FIG. 33 illustrates a modified version of the preceding embodiment of the present invention. According to this embodiment of the invention, part of an opening edge 11c of the body 11 of the regenerative light source 10, that is, the opening edge 11c facing the front of the automobile, is extended upward and its leading end is set close to the rear window glass 1. With this arrangement, even if light emitted by the regenerative light source is reflected forward through the hologram 2 onto the surface of the rear window glass 1 on the periphery thereof, the light is shielded, with the effect of preventing the reflected light from coming into the driver's field of view and dazzling the driver.

Figure 34:
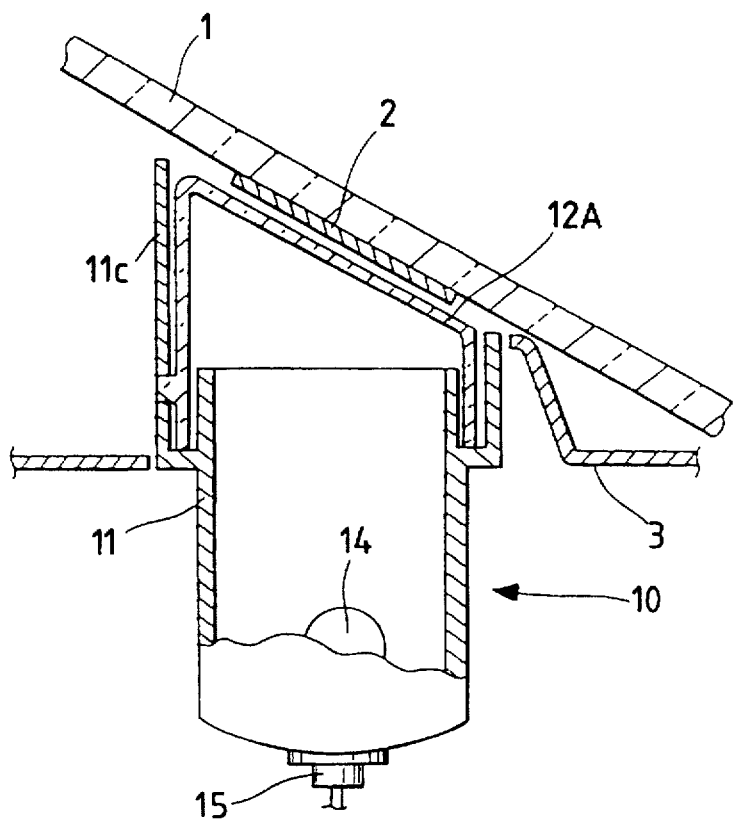
FIG. 34 is a sectional view of an improved version according to the present invention.

FIG. 34 illustrates a further improved version of the embodiment shown in FIG. 33, wherein the red filter 12A of the regenerative light source is inclined along the opening edge 11c of the body structured as shown in FIG. 33, that is, along the surface of the rear window glass 1. The red filter 12A can be set closer to the hologram 2, which is effective not only in uniformly irradiating the hologram 2 with light, but also in generating a uniformly bright hologram image.

In comparison with the construction shown in FIG. 33, moreover, the internal capacity of the regenerative light source formed with the body 11 and the red filter 12A is increased with the effect not only of increasing the heat capacity but also preventing the body 11 of the regenerative light source, the red filter 12A and the like from being overheated when the light bulb 14 is turned on.

As set forth above, the regenerative light source for irradiating the hologram provided on the rear window glass of an automobile is installed in such a way that the regenerative light source is partially buried in a recess provided in the rear parcel shelf thereof, and a shielding wall is installed around part of the regenerative light source, so that the light emitted to the hologram cannot be blocked off, for example, b baggage covering the regenerative light source, thus ensuring to ensure the operation of HMSL. As the light reflected from the hologram is obstructed by the shielding wall, it will never come into the driver's view; thus, the driver is prevented from being dazzled thereby.

Since part of the regenerative light source is buried in the recess, moreover, the vertical dimension of the regenerative light source above the rear parcel shelf is minimized so as to ensure the rear view field of the driver. At the same time, the protruded portion of the regenerative light source into the trunk room under the rear parcel shelf is minimized in dimension to ensure that a desired trunk space is secured.

As the shielding wall is formed by folding up part of the panel forming the rear parcel shelf, the shielding wall prevents the regenerative light source from being exposed and degraded in external appearance as a result of projection of the regenerative light source inside the car chamber. In this case, the reflected light from the hologram can be blocked off with certainty by extending the leading end of the shielding wall up to the position close to the inside of the rear window glass.

The formation of the apron-shaped shielding wall integral with the body on the part of the peripheral edge of the body of the regenerative light source allows the addition of the regenerative light source to the rear parcel shelf, which makes it unnecessary to form the shielding wall on the rear parcel shelf. Thus a lamp constructed according to the present invention can easily be manufactured for any automobile.

As the regenerative light source used for irradiating the hologram provided on the curved automotive rear window glass has an opening which is curved along the hologram, moreover, the radiation pattern of light incident on the hologram is also curved to conform with the hologram curved along the rear window glass, whereby the light derived from the regenerative light source is emitted onto the hologram with efficiency. Consequently, the efficiency of image regeneration is increased and light is prevented from being incident on areas other than the hologram. Consequently, it becomes possible to offer an HMSL excellent in not only visual recognizability but also external appearance.

Moreover, light irradiation with an adequate radiation pattern can be maintained at all times, irrespective of the location of the regenerative light source, by conforming the center line of the above opening to that of the hologram. Thus, the freedom of designing the HMSL is increased further.

The emission of condensing light from the regenerative light source and the setting of its opening in parallel with the hologram make it possible to install the regenerative light source as close to the rear window glass as possible, so that the space required for installing the HMSL is reduced.

What is claimed is:

1. An automotive high mount stop lamp comprising: a hologram provided on a curved portion of a rear window glass, and a regenerative light source for regenerating an image to the rear of an automobile by irradiating said hologram, said regenerative light source emitting light from an opening of a body of said light source, said opening being curved along said hologram, wherein said regenerative light source emits condensing light from said opening of said body, and wherein said opening is curved parallel to said hologram.

2. An automotive high mount stop lamp comprising: a hologram extending along a rear window glass, and a regenerative light source for regenerating a holographic image to the rear of an automobile by irradiating said hologram, said hologram being smaller in width than an opening in a body portion of said regenerative light source through which light is irradiated from said regenerative light source, and wherein said hologram is irradiated with condensing light from said regenerative light source in such a state that light therefrom is smaller in width than said opening.

3. An automotive high mount stop lamp as claimed in claim 2, wherein said hologram comprises a plurality of subdivided holograms, and wherein the subdivided holograms have different incident angles of light corresponding to respective incident angles of condensing or diffusing light.

4. An automotive high mount stop lamp comprising:

a hologram provided on a rear window glass; and a regenerative light source for regenerating a hologram image in the rear of an automobile by irradiating the hologram with light rays, said light rays condensing in a first direction and parallel in a second direction which is substantially perpendicular to said first direction.

5. An automotive high mount stop lamp as set forth in claim 4, wherein said hologram is shaped substantially in the form of a rectangle, having a smaller dimension in said first direction and a larger dimension in said second direction.

6. An automotive high mount stop lamp, comprising:

a hologram provided on a curved portion of a rear window glass; and a regenerative light source for regenerating an image to the rear of an automobile by irradiating said hologram with condensing light.

* * * * *